United States Patent [19]
Kobayashi et al.

[11] 3,795,854
[45] Mar. 5, 1974

[54] SYSTEM FOR DRIVING AN ELECTRIC PULSE MOTOR HAVING DUTY CYCLE CONTROL OF WINDING EXCITATION SIGNALS

[75] Inventors: Kengo Kobayashi, Kawasaki; Mitsuo Manabe, Tokyo, both of Japan

[73] Assignee: Fujitsu Limited, Kawasaki-shi, Japan

[22] Filed: Dec. 13, 1971

[21] Appl. No.: 207,037

[30] Foreign Application Priority Data
Dec. 25, 1970  Japan............................. 45-129759
Feb. 10, 1971  Japan................................. 46-5368
Mar. 19, 1971  Japan............................... 46-15561
Mar. 30, 1971  Japan............................... 46-18898
Mar. 30, 1971  Japan............................... 46-18899

[52] U.S. Cl.................................. 318/696, 318/685
[51] Int. Cl............................................ H02k 37/00
[58] Field of Search ... 318/254, 696, 685, 138, 439, 318/699, 599, 603

[56] References Cited
UNITED STATES PATENTS

| | | | |
|---|---|---|---|
| 3,586,953 | 6/1971 | Markuanen | 318/685 |
| 3,593,097 | 7/1971 | Gebelein | 318/696 |
| 3,579,279 | 5/1971 | Inaba et al. | 318/696 |
| 3,466,520 | 9/1969 | Aylikci et al. | 318/696 |
| 3,660,746 | 5/1972 | Milek | 318/696 |
| 3,328,658 | 6/1967 | Thompson | 318/696 |
| 3,636,429 | 1/1972 | Pawletko | 318/696 |
| 3,588,661 | 6/1971 | Newell | 318/696 |
| 3,345,547 | 10/1967 | Dunne | 318/254 |

*Primary Examiner*—G. R. Simmons
*Attorney, Agent, or Firm*—Maleson, Kimmelman & Ratner

[57] ABSTRACT

In a system for driving an electric pulse motor by changing the exciting phase in turn and stepping the rotor of the electric pulse motor, the present invention utilizes a control circuit which repeats the forward and reverse stepping signals in a ratio according to the step position, and stops or vibrates the rotor in a predetermined position between the step positions which are determined by the number of exiting phases and the number of teeth per each phase. According to the present invention, a number of steps per unit distance larger than the number of steps per unit distance which are determined by the number of exciting phases and the number of teeth per each phase can be obtained by suitably determining the sequence of input pulses of a logic circuit which determines the exciting phases. According to the exciting system of the present invention, the number of steps and the quantity of steps are not restricted by the number of phases nor by the driving system. In the driving system, by further detecting the position of the displacement of the mechanical system driven by the pulse motor and providing an error detector circuit which operates on the pulse motor via the above-mentioned control circuit so as to bring detected value into coincidence with the command value, a more precise numerical control system can be provided.

6 Claims, 38 Drawing Figures

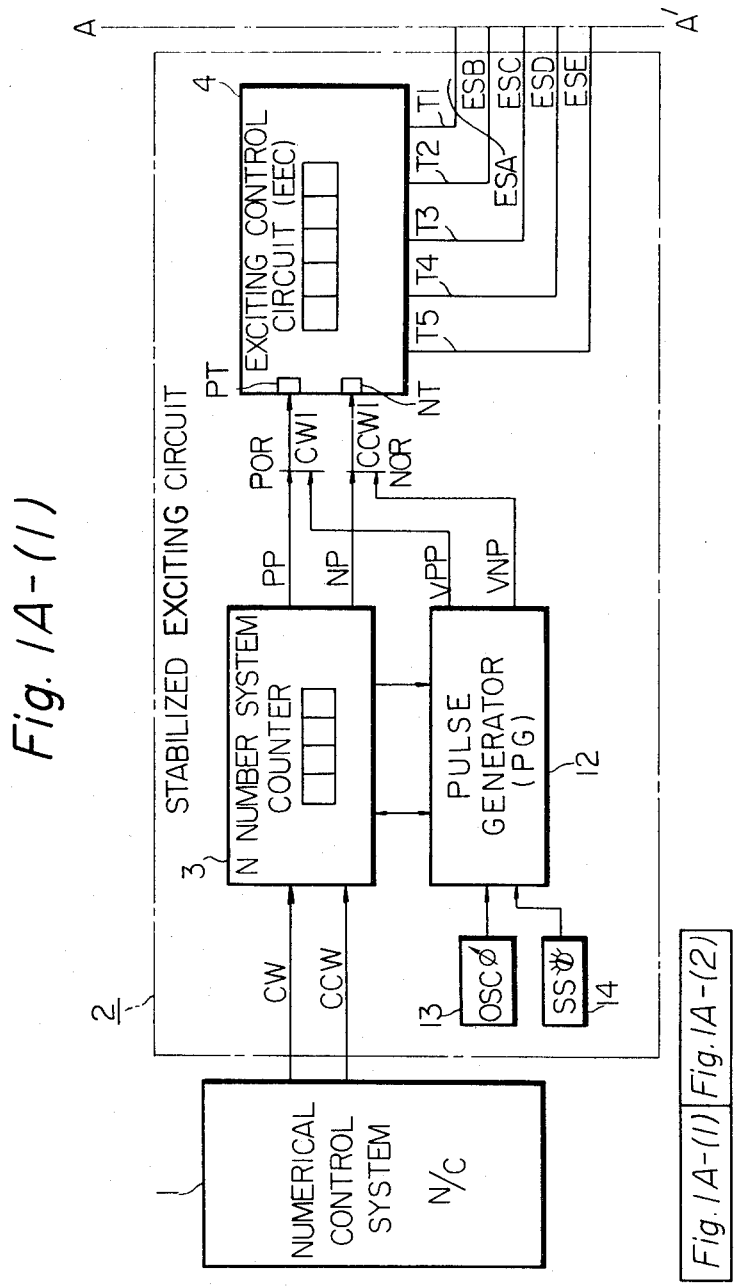

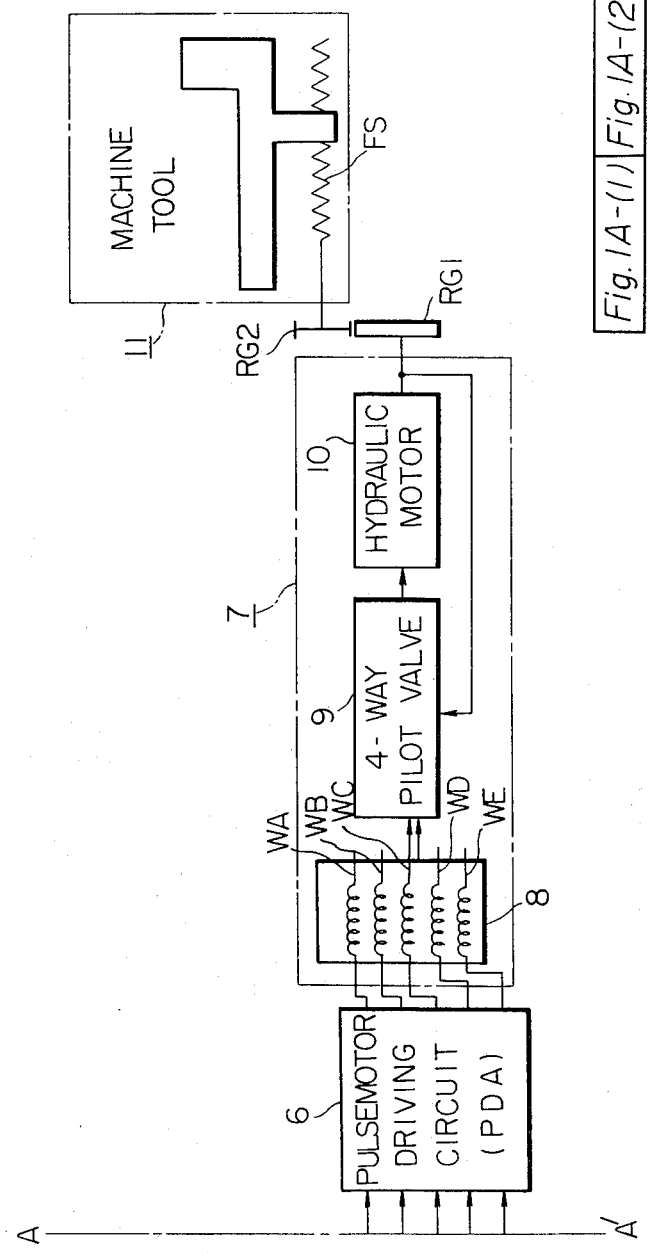
Fig. IA-(2)

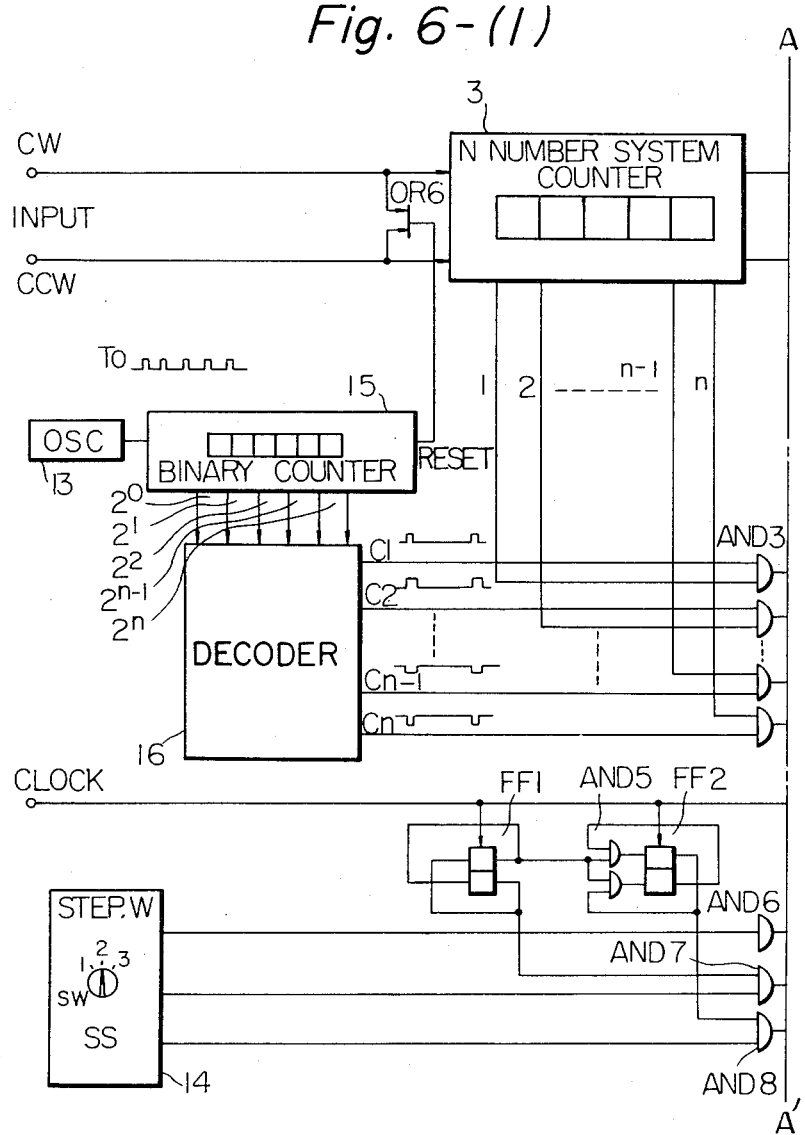
Fig. 6-(1)

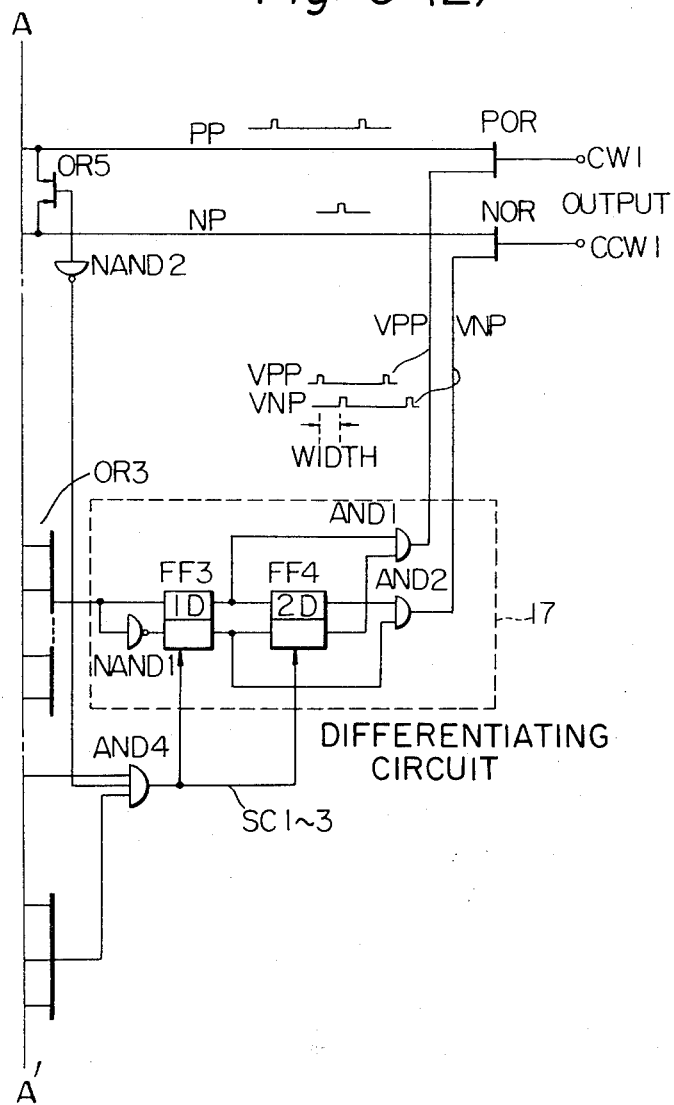
Fig. 6-(2)
Fig. 6-(1) | Fig. 6-(2)

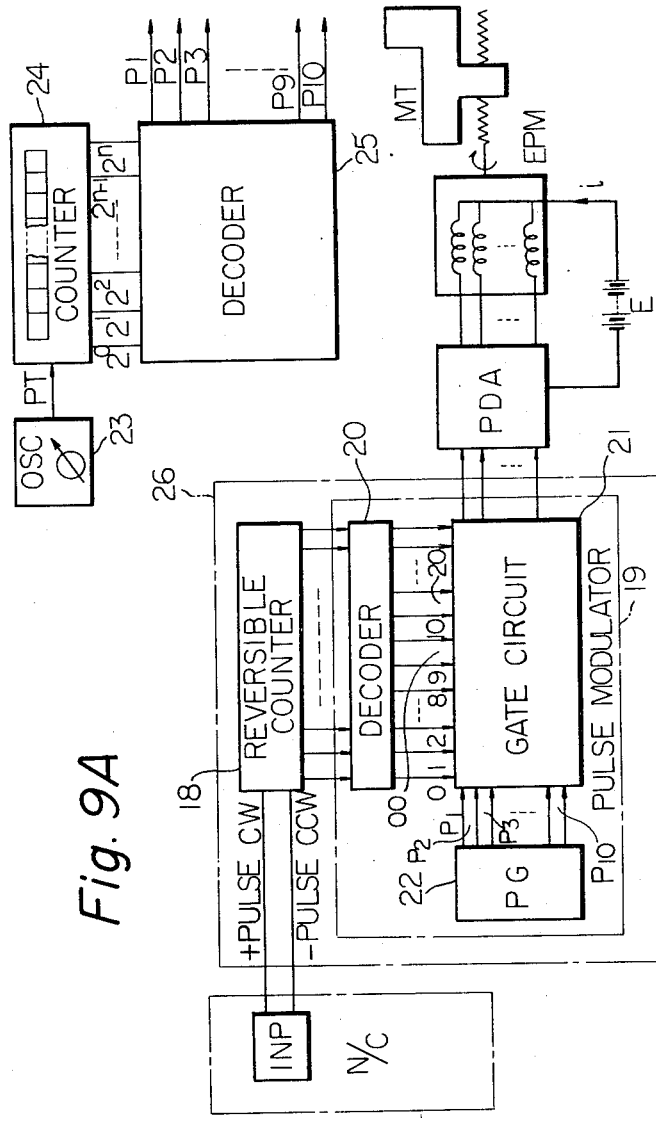

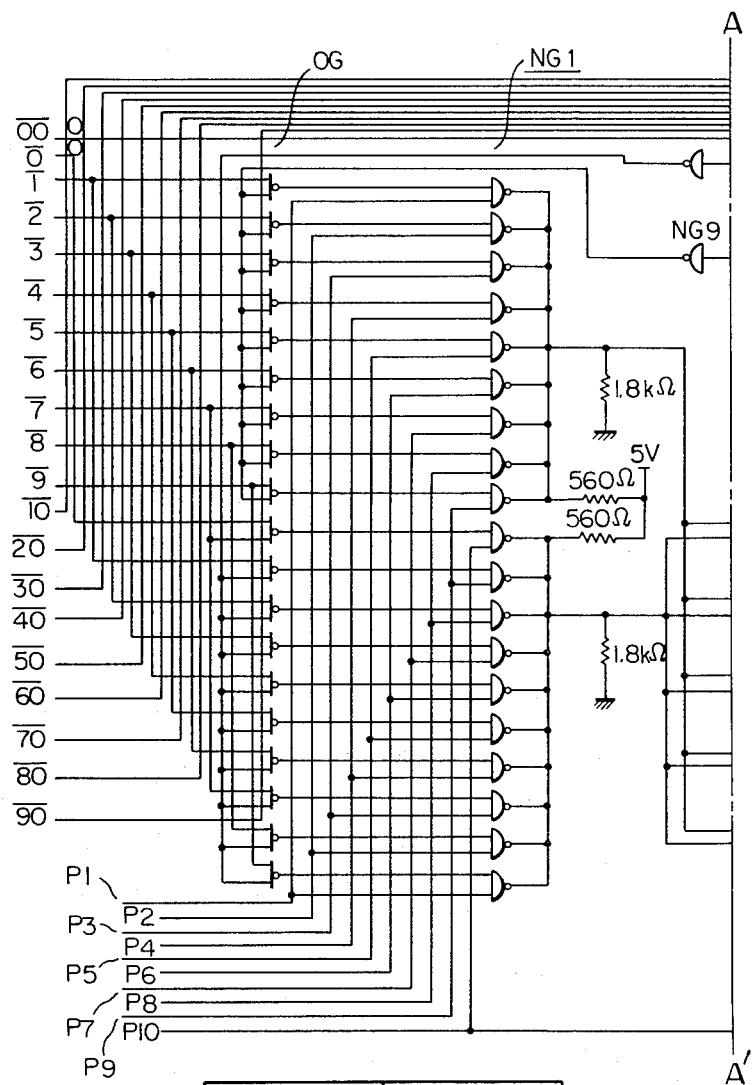
Fig. 9C-(1)

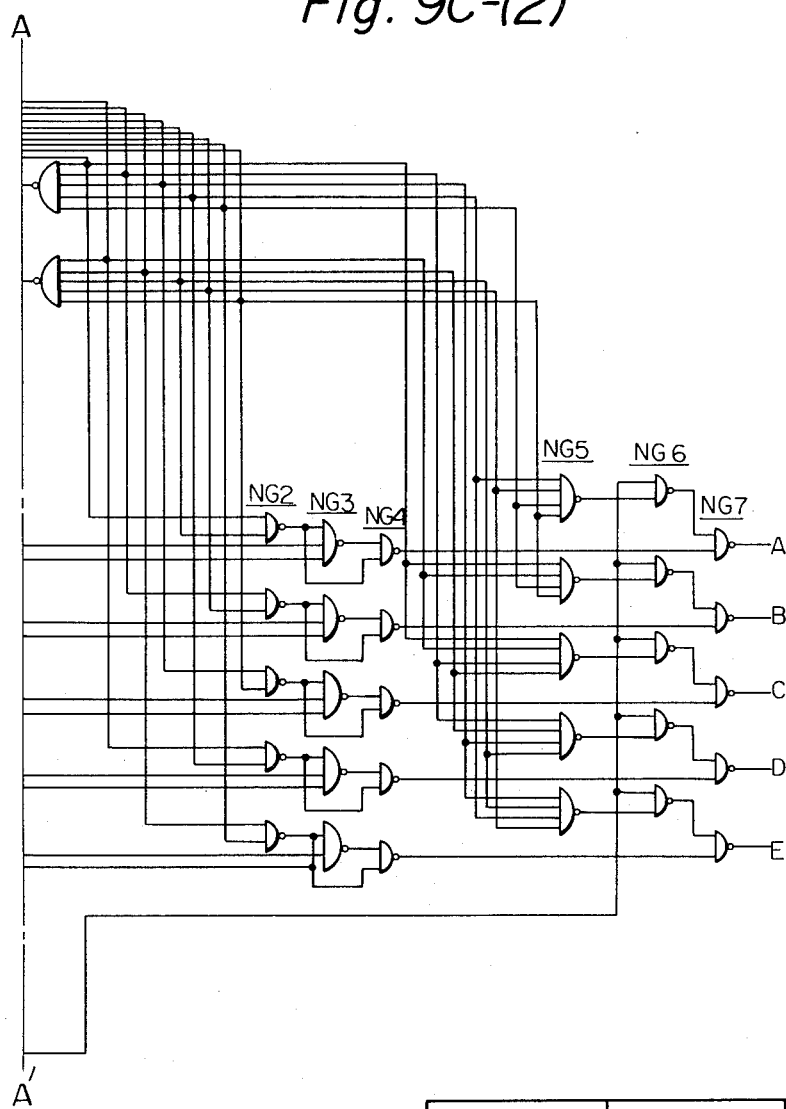
Fig. 9C-(2)
| Fig.9C-(1) | Fig.9C-(2) |

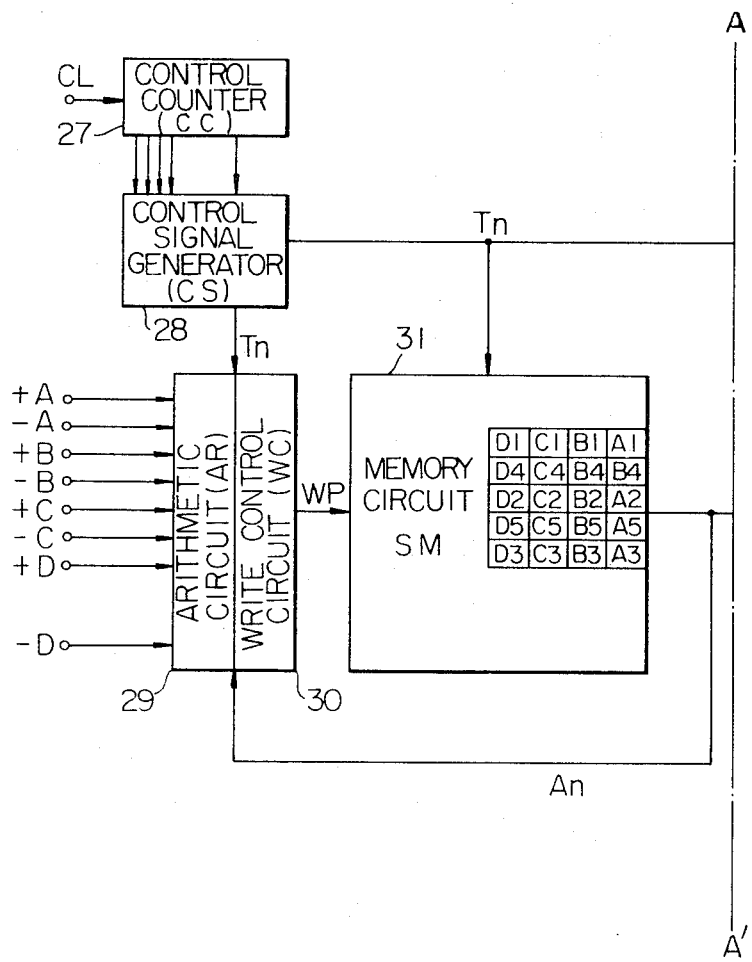
Fig. 12-(1)
| Fig.12-(1) | Fig.12-(2) |

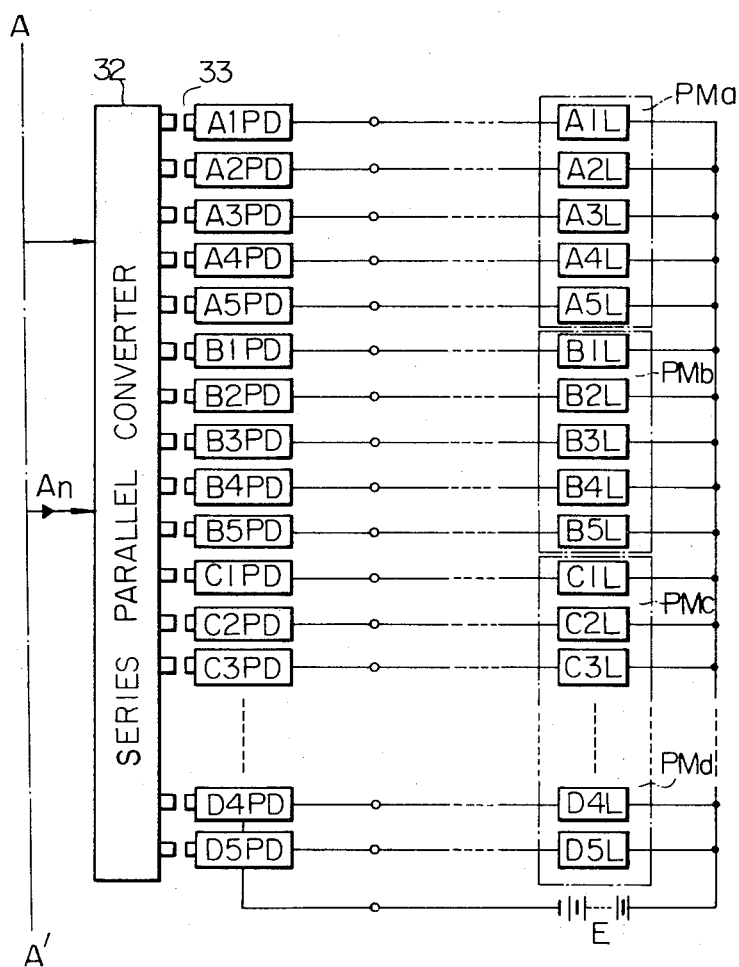
Fig. 12-(2)
| Fig.12-(1) | Fig.12-(2) |

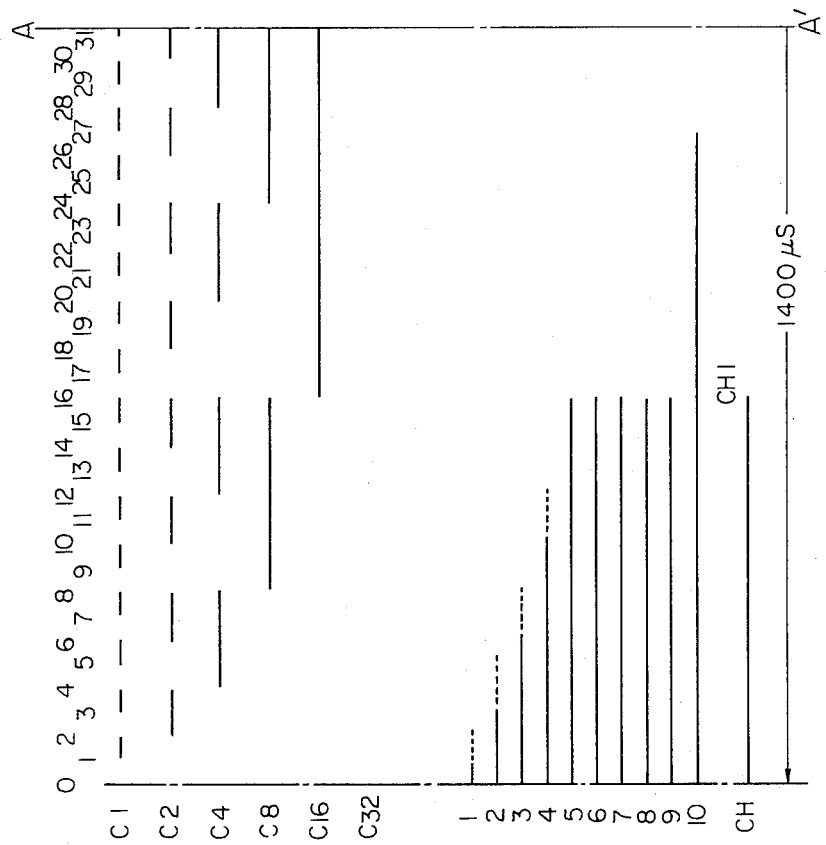

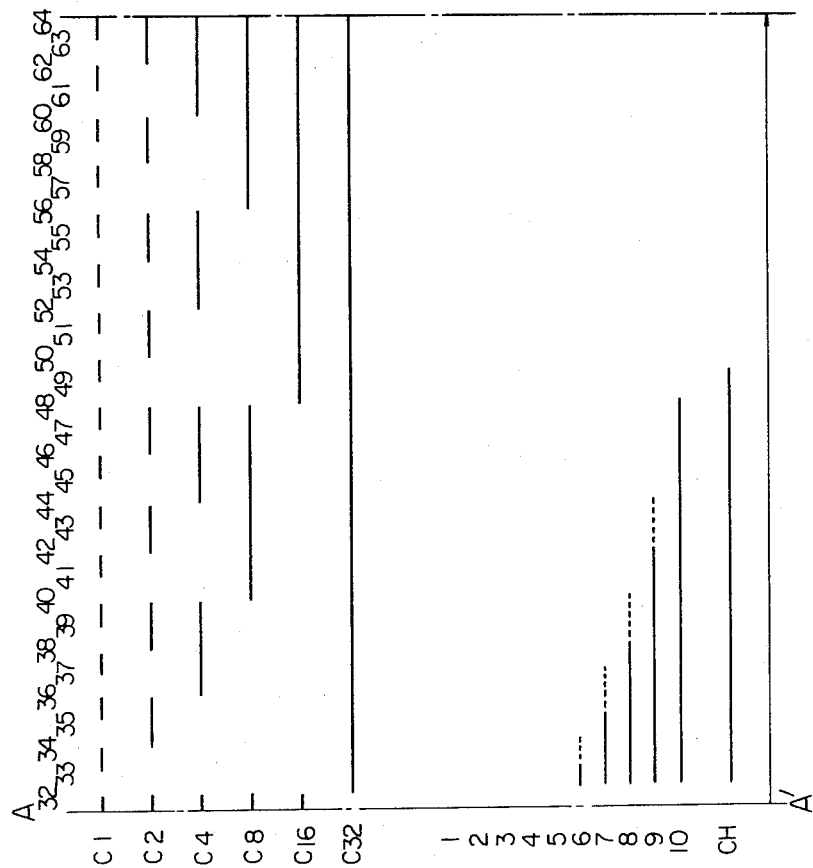
Fig. 19-(2)
| Fig.19-(1) | Fig.19-(2) |

SYSTEM FOR DRIVING AN ELECTRIC PULSE MOTOR HAVING DUTY CYCLE CONTROL OF WINDING EXCITATION SIGNALS

The present invention relates to a system for driving an electric pulse motor in a multistable condition wherein the number of steps is larger than the steps which are determined by the number of exciting phases and the number of teeth per each phase.

When high precision positioning is required in the numerical control machine with an open loop using an electric pulse motor, a linear electric pulse motor, or an electric hydraulic pulse motor, it is necessary to finely determine the increment of the displacement of the mechanical system due to the step from the command pulses. For achieving this purpose, the following methods can be considered: that is, (a) a large number of steps is provided by increasing the number of phases of the pulse motor, (b) a large number of steps is provided by controlling the current of the adjacent exciting phases of the pulse motor, (c) a large number of steps is provided by stepping down the output of the pulse motor by using gears.

However, the first method has the defects that it is very difficult to obtain with high accuracy, large number of phases of the pulse motor by increasing the number of poles and also the number of the exciting control circuits increases with increase of the number of phases. In the second method, the precision is limited by the fact that in an analog control system, the response is poor at high speed and the cost is very high. In the third method, the response at high speed is poor due to retardation and backlash of the gears. Further, in common with all three methods, even if the increment of the displacement per one pulse is very small, step errors due to the insensitive zone of the electro hydraulic motor or due to backlash in the mechanical system are generated.

The object of the present invention is to overcome the above-mentioned drawbacks and to provide a method for driving a pulse motor which provides a larger number of steps than the conventional pulse motor.

Another object of the present invention is to provide a method for driving a pulse motor which provides a larger number of steps than the number of steps which are determined by the number of exciting phases and the number of teeth per each phase, without being restricted by the number of exciting phases or by the driving system of the pulse motor.

A further object of the present invention is to provide a method for driving a pulse motor which applies forward and reverse steps repeated in a ratio according to the step position of the exciting circuit and which removes the step errors due to the inaccuracy of the mechanism, the backlash of the mechanical system, the hydraulic amplifying mechanism and the transmission error in the mechanical system.

A still further object of the present invention is to provide a high speed and highly accurate numerical control machine with steps very much smaller than the conventional numerical control machine and further which corrects the errror between the position of the displacement of the mechanical system and the command value.

Further features and advantages of the present invention will be apparent from the ensuing description with reference to the accompanying drawing to which, however, the scope of the invention is no way limited.

FIGS. 1A – 1C are block diagrams of the numerical controlling machine using the principle of the present invention;

FIG. 6 is a detailed circuit diagram of the exciting circuit using the pulse modulation according to FIG. 1A;

FIGS. 9A – 9C are blockdiagrams of another embodiment of the method according to the present invention;

FIG. 12 is a diagram in which the control pulses for pulse motor are generated by using a memory circuit;

FIG. 19 is a diagram explaining the relation between counter outputs and pulse outputs in the high speed condition;

Figure 1B:
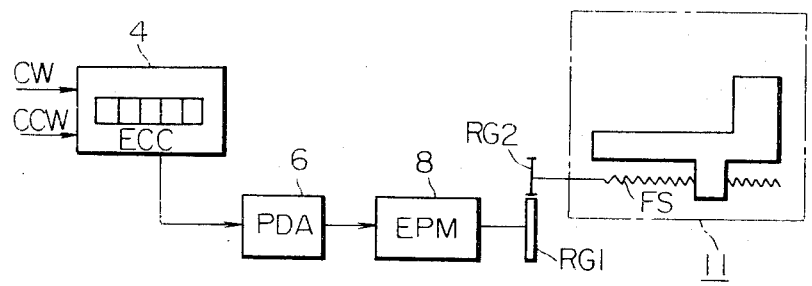

Referring to FIG. 1A, a numerical control apparatus 1 sends out a forward drive command pulse CW and a reverse command pulse CCW to a servo system, and in this system, the command unit of the mechanical system is different from the above-mentioned command pulses. That is, for example, when the position of the mechanical device is positioned every 0.01 mm, the command pulses are commanded by one pulse per 1 $\mu$ sec, the decimal counter is then used as an $n$ number system counter 3. The exciting control circuit 4 and the pulse motor step one pulse and the mechanical device moves 0.01 mm to every 10 command pulses. In FIG. 1A, the n number system counter constitutes a decimal counter, one forward command pulse PP is generated to every 10 forward drive pulses CW, and one reverse command pulse NP is generated to every 10 reverse drive pulses CCW. A series of pulses PP is supplied via OR gate (POR) to the exciting control circuit 4 as a corresponding direct drive drive pulse $CW_1$, and a series of pulses NP is supplied via OR gate (NOR) to the exciting control circuit 4 as a corresponding reverse drive pulse $CCW_1$. The exciting control circuit 4, the driving circuit for the pulse motor 6 and the electro hydraulic pulse motor 7 are arranged by technique well-known in the art, and the exciting control circuit 4 has five terminals $T_1 - T_5$ for every exciting coil of the five-phase electric pulse motor 8. The exciting control circuit 4 supplies exciting control signals ESA, ESB and ESC to the terminals $T_1$, $T_2$ and $T_3$ in the initial state, and thereafter supplies exciting control signals in the order shown in Table I every time one pulse $CW_1$ reaches a direct input terminal PT.

TABLE I

| STEP PULSE | ESA | ESB | ESC | ESD | ESE |
|---|---|---|---|---|---|
| 0 | 1 | 1 | 1 | 0 | 0 |
| 1 | 0 | 1 | 1 | 0 | 0 |
| 2 | 0 | 1 | 1 | 1 | 0 |
| 3 | 0 | 0 | 1 | 1 | 0 |
| 4 | 0 | 0 | 1 | 1 | 1 |
| 5 | 0 | 0 | 0 | 1 | 1 |
| 6 | 1 | 0 | 0 | 1 | 1 |
| 7 | 1 | 0 | 0 | 0 | 1 |
| 8 | 1 | 1 | 0 | 0 | 1 |
| 9 | 1 | 1 | 0 | 0 | 0 |
| 10 | 1 | 1 | 1 | 0 | 0 |

That is, Table I is a truth table for the excitation when the five-phase motor is, for example, excited by the alternative two-phase/three-phase excitation. As shown in Table I, when the first pulse $CW_1$ is applied to the exciting control circuit 4, only the exciting signals ESB and ESC are supplied, then every time the following pulses $CW_1$ are applied, the exciting control signals change as shown in the above-mentioned truth table. In Table I, 1 corresponds to the excitation and 0 corresponds to non-excitation. On the other hand, when one pulse $CCW_1$ is applied to the input terminal NT, the exciting control signal changes to the reverse order as shown in Table I. As mentioned above, the exciting control signals ESA – ESE are supplied to the pulse motor driving circuits 6 provided for each exciting coil of the pulse motor and when the exciting control signal is 1, said signal excites the corresponding coil among the coils $W_A - W_E$ of the pulse motor.

Figure 2:
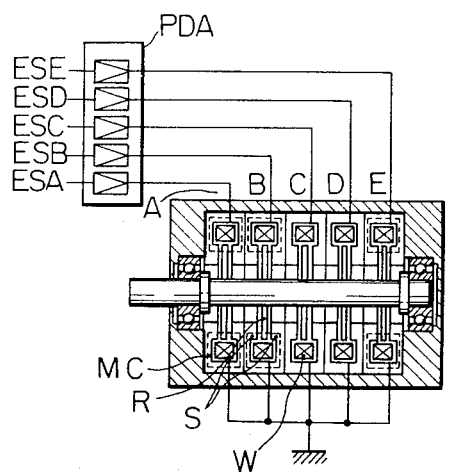
FIG. 2 is a sectional view of the electric pulse motor used in the present invention.
Figure 3:
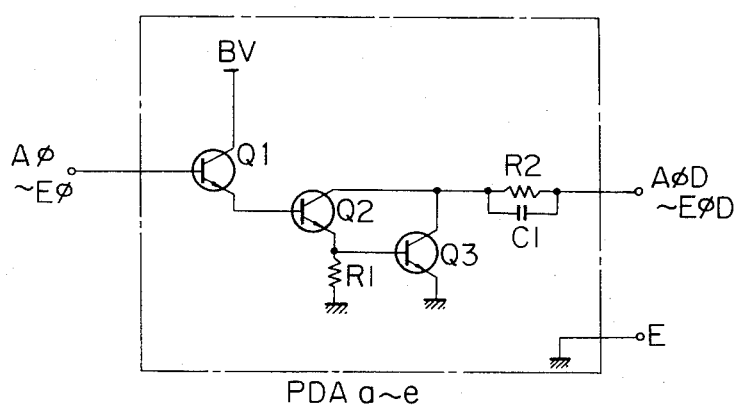
FIG. 3 is one example of the driving circuit for the electric pulse motor shown in FIG. 1A.

The pulse motor is composed of, as shown in FIG. 2, rotors R, stator elements S and exciting coils W for five phase. Twenty four teeth are provided respectively for the outer circle of the rotor element and for the side surface of the stator element. The teeth for the rotor element are provided in phase in the axial direction and the teeth for the stator element are respectively shifted in every phase in the direction of revolution one-fifth of a pitch. Referring to FIG. 2, the passage of the flux which is generated in the case of exciting a ring winding W is shown as MC. And the control of the excitation is carried out by using driving circuit 6 which is composed of, for example, transistor switching circuits $Q_1 - Q_3$ shown in FIG. 3.

Figure 4:
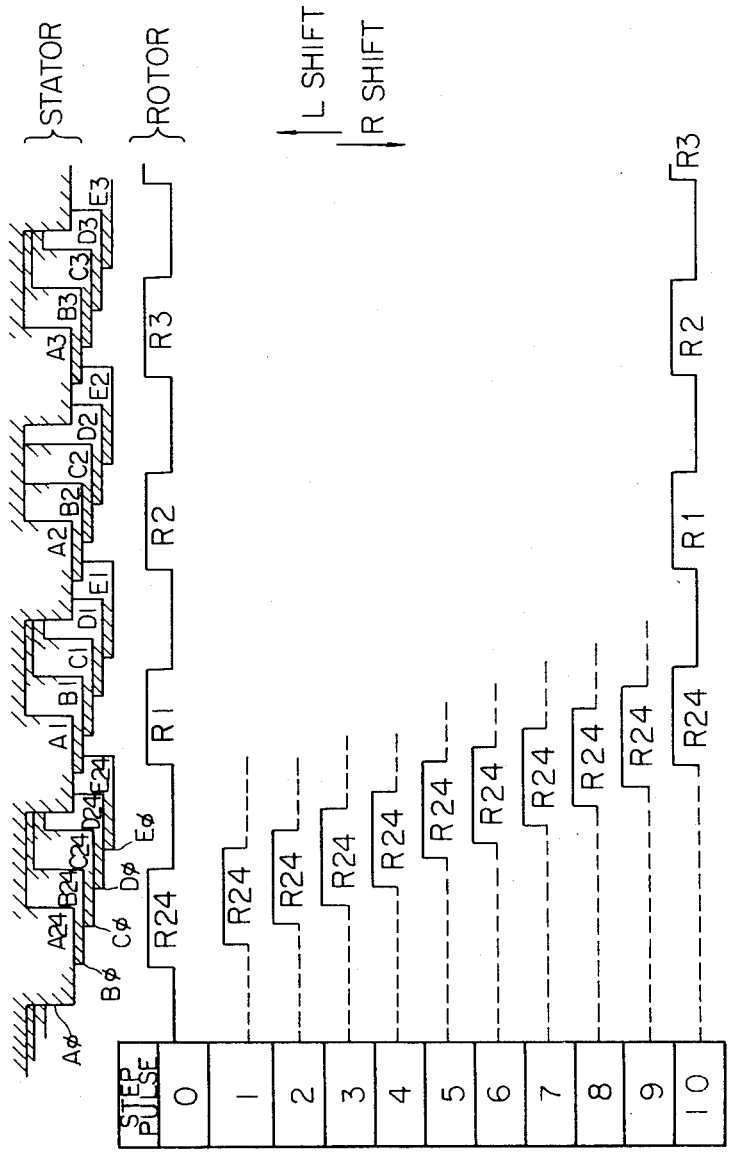
FIG. 4 is a diagram explaining the conventional step operation of the rotor of the pulse motor in the alternative two-phase/three-phase exciting system.

As a result of this, the rotor of the pulse motor steps in the order shown in FIG. 4. FIG. 4 shows the case in which the number of the teeth of the rotor and stator per one phase are respectively twenty four, and figures 1, 2 . . . 24 show the number of these teeth. In step pulse 0, the phases A – C are excited as shown in Table I, the rotor teeth $R_{24}$ stay at the middle of the region of stator teeth $A_{24} - C_{24}$. In the next step, the rotor teeth $R_{24}$ step to the middle of the region of stator teeth $B_{24}$ and $C_{24}$, due to the excitation of the phases B and C and this step is followed in the same manner and completes one revolution in 240 steps. This figure 240 equals the product of the number of teeth twice the number of phases.

The revolutions of the output of the pulse motor 8 can be supplied to the machine tool. In the example shown in FIG. 1A an electro hydraulic pulse motor 7 is utilized. In the electro hydraulic pulse motor 7, the electric pulse motor 8 controls the four way pilot valve 9, the hydraulic output of said valve 9 rotates the hydraulic motor 10. The electro hydraulic pulse motor 7 is connected via reduction gears $RG_1$ and $RG_2$ to a feed screw FS of the machine tool 11. FIG. 1B is the same as FIG. 1A except for using only the electric pulse motor 8.

Figure 1C:
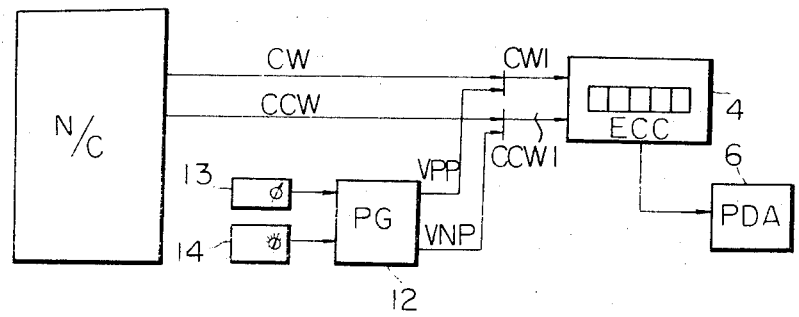

The explanation given here is of the conventional numerical controlled apparatus. And now the present invention will be explained. In the present invention, a pulse generator 12 is provided in parallel with the command pulses, and control pulses consisting of a forward rotation signal VPP and a reverse rotation signal VNP are generated in the pulse generator 12 and are provided with a predetermined period and width and are supplied to the exciting control circuit 4 via OR gates POR and NOR thereby giving a vibration of predetermined period and width to the pulse motor 8. That is, in the example of FIG. 1A, the oscillation period is determined by the step period oscillator 13 and the number of steps of the exciting control circuit 4 is determined by the step number controllor 14. When one step is determined in the step number controller 14, the pulse generator 12 generates one forward pulse VPP and after a predetermined time $t_1$ generates one reverse pulse VNP and after a further predetermined time $t_2$ again generates a forward pulse VPP. Here $t_1$ is the time for which the energy for a forward step to the rotor of the pulse motor is supplied and $t_2$ is the time for which the energy for reverting back to the original position is supplied. As mentioned above, referring to FIG. 1A, the pulse motor steps one step in the forward direction (3°) by a carry pulse of the n number system counter 3 and the machine moves 0.01 mm. Further, according to the present invention, the position of the rotor corresponding to the value of a fraction can be obtained by changing the ratio of the above-mentioned times $t_1$ and $t_2$ in accordance with the value of the fraction which remains in the n number system counter. And a stable point within one step can be obtained in the hydraulic pulse motor by applying a step which steps the pulse motor one step forward and reverses it one step. In the example of FIG. 1A, parts of the fraction are indicated as the command pulses CW and CCW, however, it is also possible to send out the forward pulse PP and the reverse pulse NP directly from the numerical control apparatus 1, to detect the error between the commanded position and the actual position and to change the ratio between the above-mentioned times $t_1$ and $t_2$ in accordance with above-mentioned error thereby compensating said error. Referring to FIG. 1C, the forward pulse VPP and reverse pulse VNP are generated and supplied to the exciting control circuit 4 independently of the command pulses CW and CCW.

Figure 5:
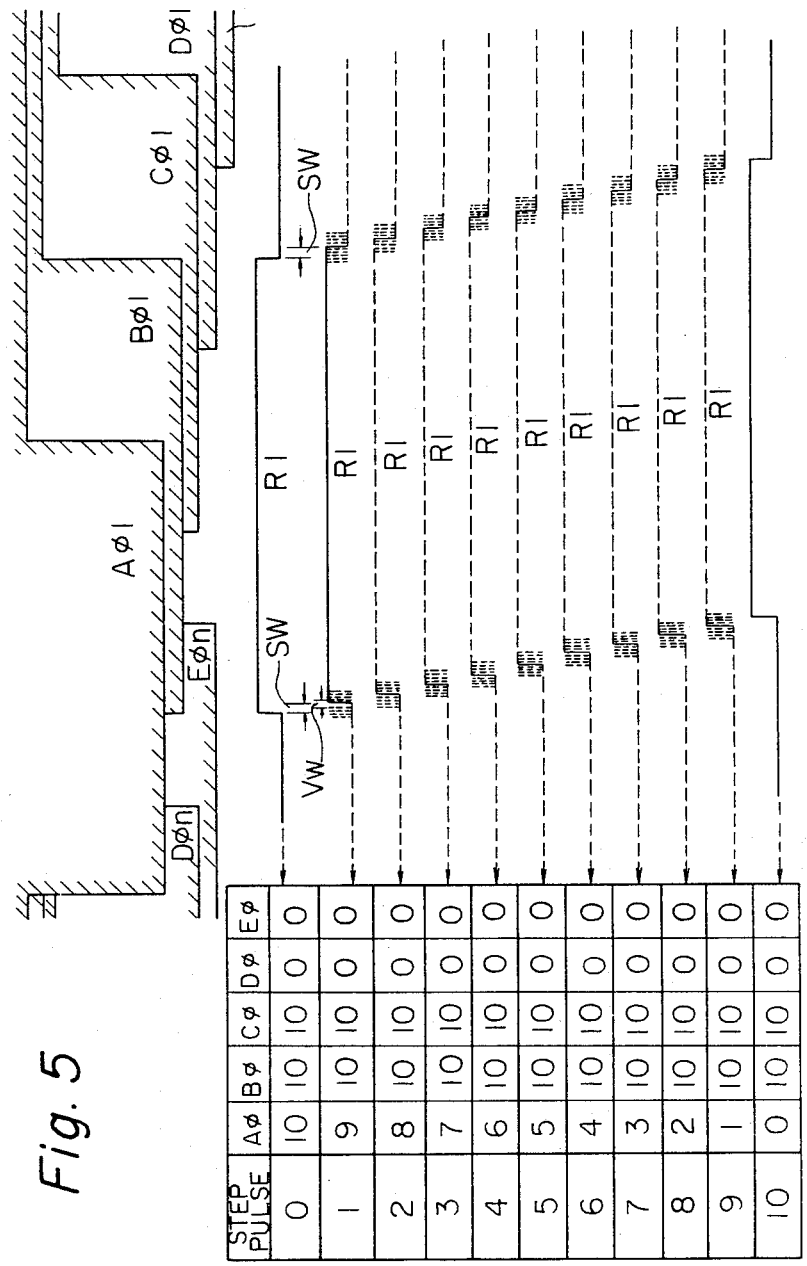
FIG. 5 is a diagram explaining the step operation of the rotor of the pulse motor according to the present invention.
Figure 7:
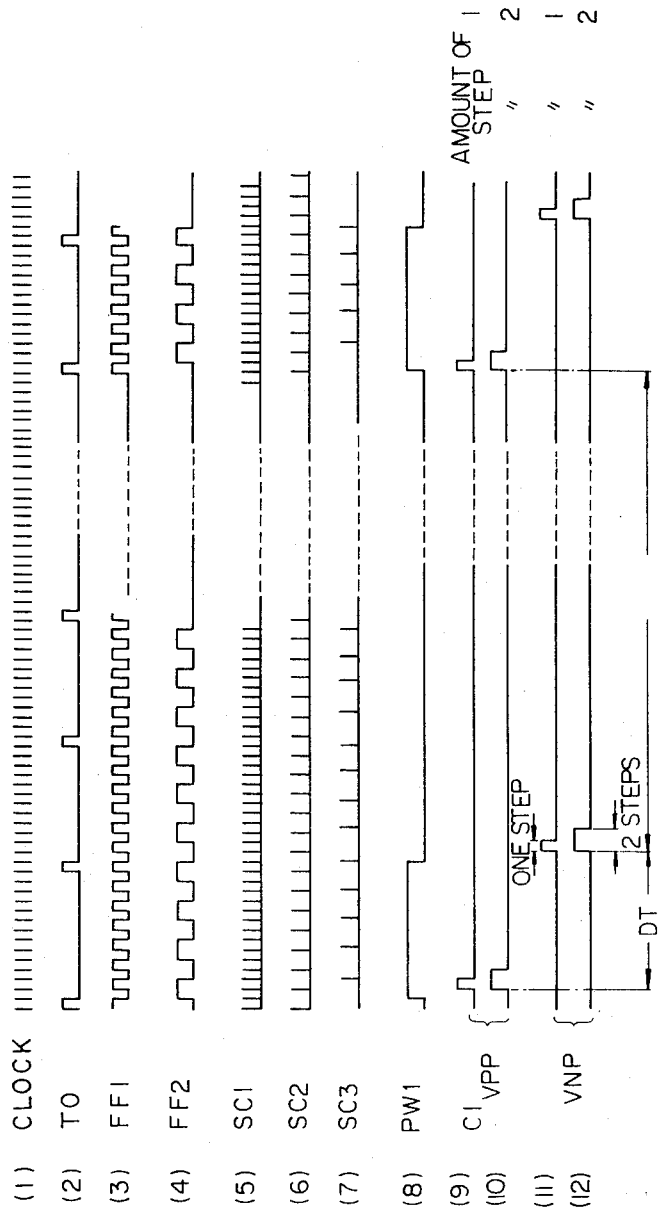
FIG. 7 is a diagram explaining the pulse waveforms in the circuit of FIG. 6.

The behavior of the rotor when the pulses VPP and VNP are applied to the exciting control circuit 4 is shown in FIG. 5. As shown in FIG. 5, in the present example of alternative three-phase/two-phase excitation, nine (generally n) stable positions are obtained during the step pulse 0 in which the phases A - C are excited, that is any number of steps larger number than the number of steps in the conventional pulse motor can be obtained. This point will now be described in detail with reference to FIGS. 5, 6, and 7. Referring to FIG. 6, the oscillator 13 generates a series of pulses having a predetermined frequency and a binary counter 15 counts these pulses continuously. The content of the binary counter 15 is converted to pulse sequences $C_1 - C_n$ by a decoder 16. The pulse sequences $C_1 - C_n$ all have the same period, however, the width of these pulses increases uniformly in succession. On the other hand, the n number system counter 3 counts the command pulses CW or CCW and generates the output pulses PP or NP at every n pulses of the command pulses. The above-mentioned counts are decoded by a decoder not shown in this figure and actuates one of output lines 1 - n. Output signals of the output lines of counter 3 are each supplied to input terminals of And gate group AND3, the above-mentioned pulse sequences $C_1 - C_n$ are applied to the other input terminals of said group AND3, and outputs of said group AND3 are supplied to OR circuit $OR_3$. As a result of this, any one of the outputs $C_1 - C_n$ of the decoder 16 selectively appears at the output terminal of the Or circuit $OR_3$ in accordance with the content of the n number system counter 3. The output of the Or gate $OR_3$ is supplied to differentiating circuit 17 which is composed of flip-flop circuits $FF_3$ and $FF_4$, Nand gate NAND1 and And gates AND1 and AND2. The differentiating circuit 17 generates the direct rotation signal VPP by differentiating the rising position of the output of the OR gate $OR_3$ and the reverse rotation signal VNP by differentiating the falling portion of the output of the OR gate $OR_3$, and these signals VPP and VNP are supplied to the OR gates POR or NOR provided in the output line of the n number system counter 3. By selecting any one of the outputs $C_1 - C_n$ of the decoder 16, it is possible to change the time ratio of $t_1$, the period from the generation of the forward rotation signal to the generation of the reverse rotation signal, to $t_2$, the period from the reverse rotation signal to the forward rotation signal. The step pulse 1 shown in FIG. 5 corresponds to the case wherein the time $t_1$ is 9 and the time $t_2$ is 1, and the step pulse 2 corresponds to the case where the time $t_1$ is 8 and the time $t_2$ is 2 and the rest is the same. Receiving the direct rotation pulse or reverse rotation pulse, the rotor $R_1$ of the pulse motor vibrates in the position stepped to one-tenth of one step from the phase A - C excitation to the B, C phase excitation as shown in the column of step pulse 1. And in the column of step pulse 2, the rotor $R_1$ vibrates in the position stepped to two-tenths of one step, and the rest is omitted. The number of steps which steps the exciting control circuit 4 is settled by the setting dial SW of the step settler 14. A clock "CLOCK" is composed of a series of pulses shown as (1) in FIG. 7, and this is counted by a two bit counter composed of flip-flop circuits $FF_1$ and $FF_2$. When one step is established, gate AND4 is opened via gates AND6 and $OR_4$, the differentiating circuit 17 including flip-flop $FF_3$ and $FF_4$ is triggered every time the clock CLOCK receives a pulse. When two steps are established, gate AND4 is opened via gates AND7, $OR_4$ then the differentiation circuit 17 is triggered every second clock pulse. As a result of this, the exciting control circuit 4 performs an operation which steps two steps forward and two steps backward and thus the amplitude of the pulse motor increases. In this case the ratio of the times $t_1$ and $t_2$ is not varied. When three steps are established, the same operation is carried out. Referring to FIG. 6, OR gate $OR_5$ and Nand gate NAND2 are provided for the pulses PP, NP and the signals VPP, VNP are not simultaneously generated.

The above-mentioned explanation is given for the rotary electric pulse motor, however it will be understood that the same explanation can be applied to the linear electric pulse motor.

Figure 8A:
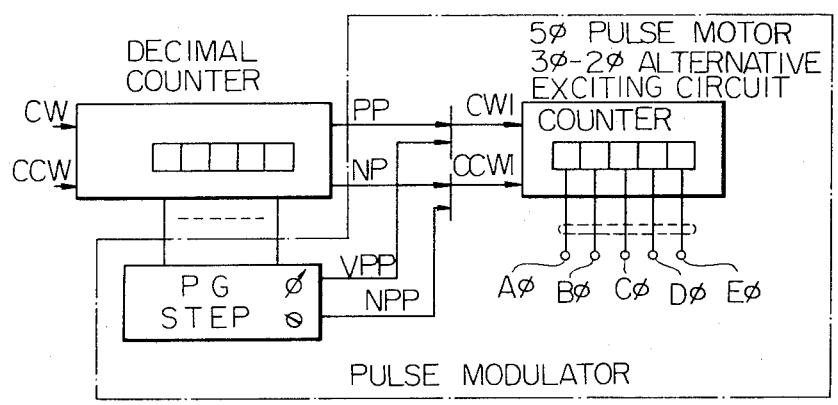
FIGS. 8A – 8D are diagrams explaining some embodiments according to the system shown in FIG. 1A.
Figure 8B:
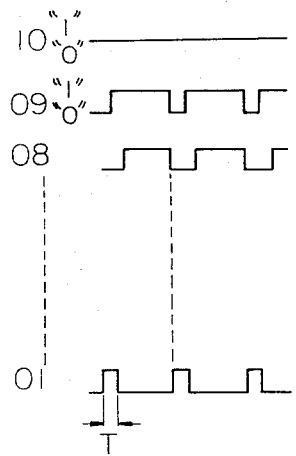

FIG. 8A shows the circuit in which alternative three-phase two-phase excitation is used as the exciting control circuit 4, a decimal counter is used as the counter 3 and then a five phase pulse motor is stepped with 100 steps. The truth value in the case of FIG. 8A is shown in Table II. In this table, 10 represents full excitation, 0 represents non excitation and 9, 8, . . . 1 represent as shown in FIG. 8B, excitations which are excited during some periods and not excited during some periods then stepped forwardly during some periods and reversely stepped during some period.

Figure 8C:
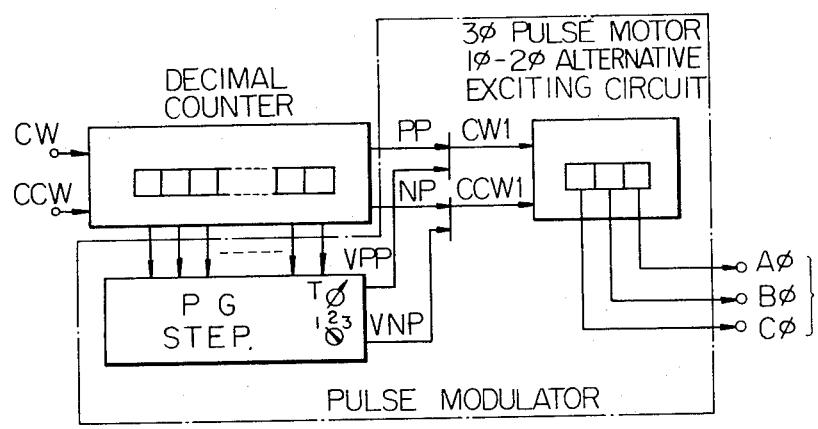

Next, FIG. 8C shows the circuit in which a three-phase pulse motor which is provided with 60 steps by using alternative one-phase/two-phase excitation and a decimal counter, and the exciting truth table in this case is shown in Table III.

Figure 8D:
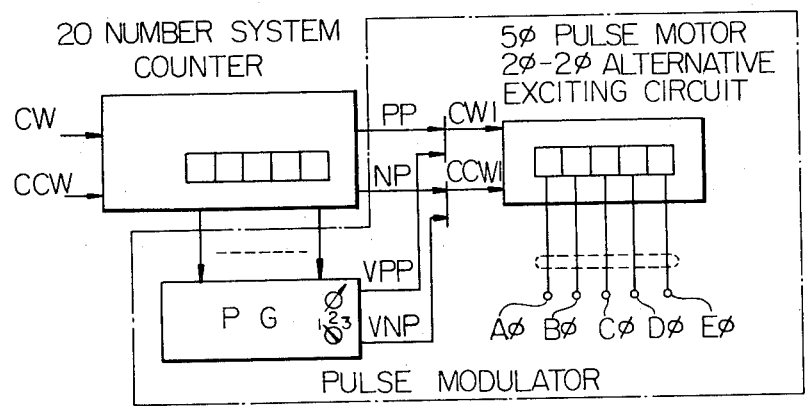

Further, FIG. 8D shows the circuit in which a five phase pulse motor which is provided with 100 steps by using alternative two-phase/two-phase excitation circuit and a binary counter, and the exciting truth table in this case is shown in Table IV. Referring to this table, 20 represents full excitation, 0 represents non-excitation and 1, 2, . . . etc. represent the excitation of step 1/20, 2/20, . . . etc.

Table II

| STEP PULSE | ESA | ESB | ESC | ESD | ESE | STEP PULSE | ESA | ESB | ESC | ESD | ESE |
|---|---|---|---|---|---|---|---|---|---|---|---|
| 0 | 10 | 10 | 10 | 0 | 0 | 26 | 0 | 4 | 10 | 10 | 0 |
| 1 | 9 | 10 | 10 | 0 | 0 | 27 | 0 | 3 | 10 | 10 | 0 |
| 2 | 8 | 10 | 10 | 0 | 0 | 28 | 0 | 2 | 10 | 10 | 0 |
| 3 | 7 | 10 | 10 | 0 | 0 | 29 | 0 | 1 | 10 | 10 | 0 |
| 4 | 6 | 10 | 10 | 0 | 0 | 30 | 0 | 0 | 10 | 10 | 0 |
| 5 | 5 | 10 | 10 | 0 | 0 | 31 | 0 | 0 | 10 | 10 | 1 |
| 6 | 4 | 10 | 10 | 0 | 0 | 32 | 0 | 0 | 10 | 10 | 2 |
| 7 | 3 | 10 | 10 | 0 | 0 | 33 | 0 | 0 | 10 | 10 | 3 |
| 8 | 2 | 10 | 10 | 0 | 0 | 34 | 0 | 0 | 10 | 10 | 4 |
| 9 | 1 | 10 | 10 | 0 | 0 | 35 | 0 | 0 | 10 | 10 | 5 |
| 10 | 0 | 10 | 10 | 0 | 0 | 36 | 0 | 0 | 10 | 10 | 6 |
| 11 | 0 | 10 | 10 | 1 | 0 | 37 | 0 | 0 | 10 | 10 | 7 |
| 12 | 0 | 10 | 10 | 2 | 0 | 38 | 0 | 0 | 10 | 10 | 8 |
| 13 | 0 | 10 | 10 | 3 | 0 | 39 | 0 | 0 | 10 | 10 | 9 |
| 14 | 0 | 10 | 10 | 4 | 0 | 40 | 0 | 0 | 10 | 10 | 10 |
| 15 | 0 | 10 | 10 | 5 | 0 | 41 | 0 | 0 | 9 | 10 | 10 |
| 16 | 0 | 10 | 10 | 6 | 0 | 42 | 0 | 0 | 8 | 10 | 10 |
| 17 | 0 | 10 | 10 | 7 | 0 | 43 | 0 | 0 | 7 | 10 | 10 |
| 18 | 0 | 10 | 10 | 8 | 0 | 44 | 0 | 0 | 6 | 10 | 10 |
| 19 | 0 | 10 | 10 | 9 | 0 | 45 | 0 | 0 | 5 | 10 | 10 |
| 20 | 0 | 10 | 10 | 10 | 0 | 46 | 0 | 0 | 4 | 10 | 10 |
| 21 | 0 | 9 | 10 | 10 | 0 | 47 | 0 | 0 | 3 | 10 | 10 |
| 22 | 0 | 8 | 10 | 10 | 0 | 48 | 0 | 0 | 2 | 10 | 10 |
| 23 | 0 | 7 | 10 | 10 | 0 | 49 | 0 | 0 | 1 | 10 | 10 |
| 24 | 0 | 6 | 10 | 10 | 0 | 50 | 0 | 0 | 0 | 10 | 10 |
| 25 | 0 | 5 | 10 | 10 | 0 | | | | | | |

Table II (Continued)

| STEP PULSE | ESA | ESB | ESC | ESD | ESE | STEP PULSE | ESA | ESB | ESC | ESD | ESE |
|---|---|---|---|---|---|---|---|---|---|---|---|
| 51 | 1 | 0 | 0 | 10 | 10 | 76 | 10 | 6 | 0 | 0 | 10 |
| 52 | 2 | 0 | 0 | 10 | 10 | 77 | 10 | 7 | 0 | 0 | 10 |
| 53 | 3 | 0 | 0 | 10 | 10 | 78 | 10 | 8 | 0 | 0 | 10 |
| 54 | 4 | 0 | 0 | 10 | 10 | 79 | 10 | 9 | 0 | 0 | 10 |
| 55 | 5 | 0 | 0 | 10 | 10 | 80 | 10 | 10 | 0 | 0 | 10 |
| 56 | 6 | 0 | 0 | 10 | 10 | 81 | 10 | 10 | 0 | 0 | 9 |
| 57 | 7 | 0 | 0 | 10 | 10 | 82 | 10 | 10 | 0 | 0 | 8 |
| 58 | 8 | 0 | 0 | 10 | 10 | 83 | 10 | 10 | 0 | 0 | 7 |
| 59 | 9 | 0 | 0 | 10 | 10 | 84 | 10 | 10 | 0 | 0 | 6 |
| 60 | 10 | 0 | 0 | 9 | 10 | 85 | 10 | 10 | 0 | 0 | 5 |
| 61 | 10 | 0 | 0 | 8 | 10 | 86 | 10 | 10 | 0 | 0 | 4 |
| 62 | 10 | 0 | 0 | 7 | 10 | 87 | 10 | 10 | 0 | 0 | 3 |
| 63 | 10 | 0 | 0 | 6 | 10 | 88 | 10 | 10 | 0 | 0 | 2 |
| 64 | 10 | 0 | 0 | 5 | 10 | 89 | 10 | 10 | 0 | 0 | 1 |
| 65 | 10 | 0 | 0 | 4 | 10 | 90 | 10 | 10 | 0 | 0 | 0 |
| 66 | 10 | 0 | 0 | 3 | 10 | 91 | 10 | 10 | 1 | 0 | 0 |
| 67 | 10 | 0 | 0 | 2 | 10 | 92 | 10 | 10 | 2 | 0 | 0 |
| 68 | 10 | 0 | 0 | 1 | 10 | 93 | 10 | 10 | 3 | 0 | 0 |
| 69 | 10 | 0 | 0 | 0 | 10 | 94 | 10 | 10 | 4 | 0 | 0 |
| 70 | 10 | 0 | 0 | 0 | 10 | 95 | 10 | 10 | 5 | 0 | 0 |
| 71 | 10 | 1 | 0 | 0 | 10 | 96 | 10 | 10 | 6 | 0 | 0 |
| 72 | 10 | 2 | 0 | 0 | 10 | 97 | 10 | 10 | 7 | 0 | 0 |
| 73 | 10 | 3 | 0 | 0 | 10 | 98 | 10 | 10 | 8 | 0 | 0 |
| 74 | 10 | 4 | 0 | 0 | 10 | 99 | 10 | 10 | 9 | 0 | 0 |
| 75 | 10 | 5 | 0 | 0 | 10 | 100 | 10 | 10 | 10 | 0 | 0 |

Table III

| STEP PULSE | ESA | ESB | ESC | STEP PULSE | ESA | ESB | ESC |
|---|---|---|---|---|---|---|---|
| 0 | 10 | 10 | 0 | 31 | 1 | 0 | 10 |
| 1 | 9 | 10 | 0 | 32 | 2 | 0 | 10 |
| 2 | 8 | 10 | 0 | 33 | 3 | 0 | 10 |
| 3 | 7 | 10 | 0 | 34 | 4 | 0 | 10 |
| 4 | 6 | 10 | 0 | 35 | 5 | 0 | 10 |
| 5 | 5 | 10 | 0 | 36 | 6 | 0 | 10 |
| 6 | 4 | 10 | 0 | 37 | 7 | 0 | 10 |
| 7 | 3 | 10 | 0 | 38 | 8 | 0 | 10 |
| 8 | 2 | 10 | 0 | 39 | 9 | 0 | 10 |
| 9 | 1 | 10 | 0 | 40 | 10 | 0 | 10 |
| 10 | 0 | 10 | 0 | 41 | 10 | 0 | 9 |
| 11 | 0 | 10 | 1 | 42 | 10 | 0 | 8 |
| 12 | 0 | 10 | 2 | 43 | 10 | 0 | 7 |
| 13 | 0 | 10 | 3 | 44 | 10 | 0 | 6 |
| 14 | 0 | 10 | 4 | 45 | 10 | 0 | 5 |
| 15 | 0 | 10 | 5 | 46 | 10 | 0 | 4 |
| 16 | 0 | 10 | 6 | 47 | 10 | 0 | 3 |
| 17 | 0 | 10 | 7 | 48 | 10 | 0 | 2 |
| 18 | 0 | 10 | 8 | 49 | 10 | 0 | 1 |
| 19 | 0 | 10 | 9 | 50 | 10 | 0 | 0 |
| 20 | 0 | 10 | 10 | 51 | 10 | 1 | 0 |
| 21 | 0 | 9 | 10 | 52 | 10 | 2 | 0 |
| 22 | 0 | 8 | 10 | 53 | 10 | 3 | 0 |
| 23 | 0 | 7 | 10 | 54 | 10 | 4 | 0 |
| 24 | 0 | 6 | 10 | 55 | 10 | 5 | 0 |
| 25 | 0 | 5 | 10 | 56 | 10 | 6 | 0 |
| 26 | 0 | 4 | 10 | 57 | 10 | 7 | 0 |
| 27 | 0 | 3 | 10 | 58 | 10 | 8 | 0 |
| 28 | 0 | 2 | 10 | 59 | 10 | 9 | 0 |
| 29 | 0 | 1 | 10 | 60 | 10 | 10 | 0 |
| 30 | 0 | 0 | 10 | | | | |

Table IV

| STEP PULSE | ESA | ESB | ESC | ESD | ESE | STEP PULSE | ESA | ESB | ESC | ESD | ESE |
|---|---|---|---|---|---|---|---|---|---|---|---|
| 0 | 20 | 20 | 0 | 0 | 0 | 26 | 0 | 14 | 20 | 6 | 0 |
| 1 | 19 | 20 | 1 | 0 | 0 | 27 | 0 | 13 | 20 | 7 | 0 |
| 2 | 18 | 20 | 2 | 0 | 0 | 28 | 0 | 12 | 20 | 8 | 0 |
| 3 | 17 | 20 | 3 | 0 | 0 | 29 | 0 | 11 | 20 | 9 | 0 |
| 4 | 16 | 20 | 4 | 0 | 0 | 30 | 0 | 10 | 20 | 10 | 0 |
| 5 | 15 | 20 | 5 | 0 | 0 | 31 | 0 | 9 | 20 | 11 | 0 |
| 6 | 14 | 20 | 6 | 0 | 0 | 32 | 0 | 8 | 20 | 12 | 0 |
| 7 | 13 | 20 | 7 | 0 | 0 | 33 | 0 | 7 | 20 | 13 | 0 |
| 8 | 12 | 20 | 8 | 0 | 0 | 34 | 0 | 6 | 20 | 14 | 0 |
| 9 | 11 | 20 | 9 | 0 | 0 | 35 | 0 | 5 | 20 | 15 | 0 |
| 10 | 10 | 20 | 10 | 0 | 0 | 36 | 0 | 4 | 20 | 16 | 0 |
| 11 | 9 | 20 | 11 | 0 | 0 | 37 | 0 | 3 | 20 | 17 | 0 |
| 12 | 8 | 20 | 12 | 0 | 0 | 38 | 0 | 2 | 20 | 18 | 0 |
| 13 | 7 | 20 | 13 | 0 | 0 | 39 | 0 | 1 | 20 | 19 | 0 |
| 14 | 6 | 20 | 14 | 0 | 0 | 40 | 0 | 0 | 20 | 20 | 0 |
| 15 | 5 | 20 | 15 | 0 | 0 | 41 | 0 | 0 | 19 | 20 | 1 |
| 16 | 4 | 20 | 16 | 0 | 0 | 42 | 0 | 0 | 18 | 20 | 2 |
| 17 | 3 | 20 | 17 | 0 | 0 | 43 | 0 | 0 | 17 | 20 | 3 |
| 18 | 2 | 20 | 18 | 0 | 0 | 44 | 0 | 0 | 16 | 20 | 4 |
| 19 | 1 | 20 | 19 | 0 | 0 | 45 | 0 | 0 | 15 | 20 | 5 |
| 20 | 0 | 20 | 20 | 0 | 0 | 46 | 0 | 0 | 14 | 20 | 6 |
| 21 | 0 | 19 | 20 | 1 | 0 | 47 | 0 | 0 | 13 | 20 | 7 |
| 22 | 0 | 18 | 20 | 2 | 0 | 48 | 0 | 0 | 12 | 20 | 8 |
| 23 | 0 | 17 | 20 | 3 | 0 | 49 | 0 | 0 | 11 | 20 | 9 |
| 24 | 0 | 16 | 20 | 4 | 0 | 50 | 0 | 0 | 10 | 20 | 10 |
| 25 | 0 | 15 | 20 | 5 | 0 | | | | | | |

Table IV (continued)

| STEP PULSE | ESA | ESB | ESC | ESD | ESE | STEP PULSE | ESA | ESB | ESC | ESD | ESE |
|---|---|---|---|---|---|---|---|---|---|---|---|
| 51 | 0 | 0 | 9 | 20 | 11 | 66 | 6 | 0 | 0 | 14 | 20 |
| 52 | 0 | 0 | 8 | 20 | 12 | 67 | 7 | 0 | 0 | 13 | 20 |
| 53 | 0 | 0 | 7 | 20 | 13 | 68 | 8 | 0 | 0 | 12 | 20 |
| 54 | 0 | 0 | 6 | 20 | 14 | 69 | 9 | 0 | 0 | 11 | 20 |
| 55 | 0 | 0 | 5 | 20 | 15 | 70 | 10 | 0 | 0 | 10 | 20 |
| 56 | 0 | 0 | 4 | 20 | 16 | 71 | 11 | 0 | 0 | 9 | 20 |
| 57 | 0 | 0 | 3 | 20 | 17 | 72 | 12 | 0 | 0 | 8 | 20 |
| 58 | 0 | 0 | 2 | 20 | 18 | 73 | 13 | 0 | 0 | 7 | 20 |
| 59 | 0 | 0 | 1 | 20 | 19 | 74 | 14 | 0 | 0 | 6 | 20 |
| 60 | 0 | 0 | 0 | 20 | 20 | 75 | 15 | 0 | 0 | 5 | 20 |
| 61 | 1 | 0 | 0 | 19 | 20 | 76 | 16 | 0 | 0 | 4 | 20 |
| 62 | 2 | 0 | 0 | 18 | 20 | 77 | 17 | 0 | 0 | 3 | 20 |
| 63 | 3 | 0 | 0 | 17 | 20 | 78 | 18 | 0 | 0 | 2 | 20 |
| 64 | 4 | 0 | 0 | 16 | 20 | 79 | 19 | 0 | 0 | 1 | 20 |
| 65 | 5 | 0 | 0 | 15 | 20 | 80 | 20 | 0 | 0 | 0 | 20 |

Table IV (continued)

| STEP PULSE | ESA | ESB | ESC | ESD | ESE | STEP PULSE | ESA | ESB | ESC | ESD | ESE |
|---|---|---|---|---|---|---|---|---|---|---|---|
| 81 | 20 | 0 | 0 | 0 | 19 | 91 | 20 | 11 | 0 | 0 | 9 |
| 82 | 20 | 2 | 0 | 0 | 18 | 92 | 20 | 12 | 0 | 0 | 8 |
| 83 | 20 | 3 | 0 | 0 | 17 | 93 | 20 | 13 | 0 | 0 | 7 |
| 84 | 20 | 4 | 0 | 0 | 16 | 94 | 20 | 14 | 0 | 0 | 6 |
| 85 | 20 | 5 | 0 | 0 | 15 | 95 | 20 | 15 | 0 | 0 | 5 |
| 86 | 20 | 6 | 0 | 0 | 14 | 96 | 20 | 16 | 0 | 0 | 4 |
| 87 | 20 | 7 | 0 | 0 | 13 | 97 | 20 | 17 | 0 | 0 | 3 |
| 88 | 20 | 8 | 0 | 0 | 12 | 98 | 20 | 18 | 0 | 0 | 2 |
| 89 | 20 | 9 | 0 | 0 | 11 | 99 | 20 | 19 | 0 | 0 | 1 |
| 90 | 20 | 10 | 0 | 0 | 10 | 100 | 20 | 20 | 0 | 0 | 0 |

Figure 10:
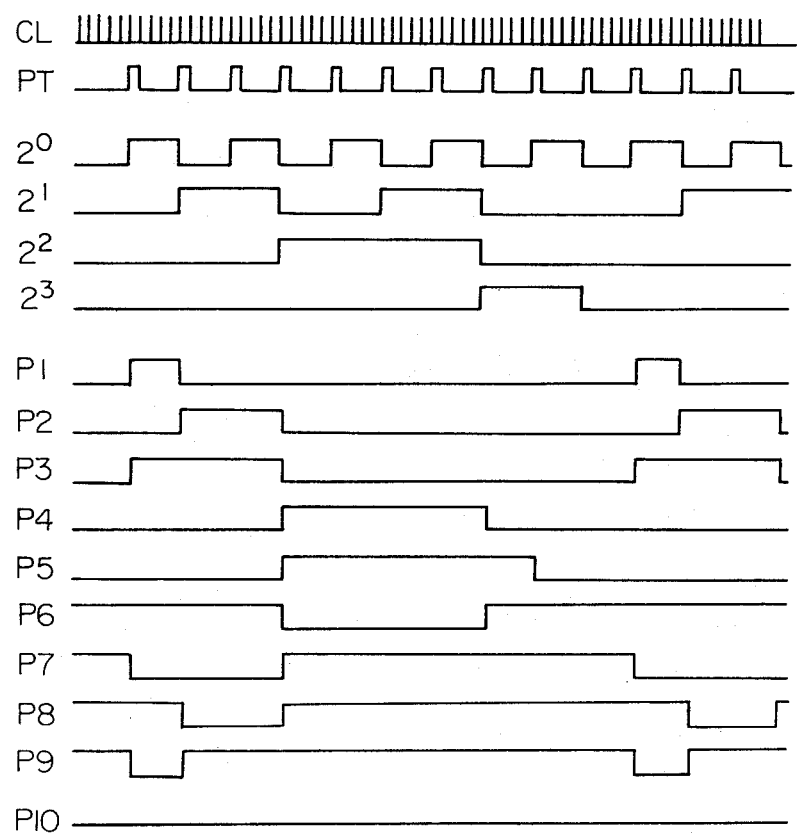
FIG. 10 is a diagram showing the waveform in some parts of the diagram shown in FIG. 9B.

As will be understood from the above-mentioned explanation, according to the present invention, $n$ times the number of steps can be obtained by using an $n$ number system counter. For example, alternative three-phase/two-phase excitation of the five phase pulse motor makes possible $5 \times 2 = 10$ steps, and makes a further $10 \times n$ steps possible by using an $n$ number system counter according to the present invention. The exciting control can be also carried out by applying modulation to the drive pulse in accordance with the content of the $n$ number system counter. FIG. 9A shows one embodiment of the control circuit according to this principle and FIG. 9B shows one example of a pulse generator used in the arrangement of FIG. 9A. FIG. 10 shows the output waveform of the circuit of FIG. 9B. Referring to FIG. 9A, a reversible counter 18 counts the drive command pulses CW or CCW. This counting state is decoded by a decoder 20 included in a pulse modulator 19 and anyone of output lines 0, 1, 2, . . . 9, 00, 10, . . . 80, 90 can be actuated. The signals of these output lines and the series of output pulses $P_1$, $P_2$, . . . $P_{10}$ from pulse generator 22 are supplied to a gate circuit 21 which generates a group of pulses for actuating the phase A – E of the pulse motor by using the logic circuit shown in FIG. 9C. Referring to FIG. 9C, the logic circuit includes a group of nand gates $NG_{1-9}$ and a group of or gates OG. The decoder 20 decodes the content of the counter 18 and when said content is, for example, "56", lines 50 and 6 among the lines 0, 1, . . . 9, $\overline{00}$, $\overline{10}$, . . . $\overline{90}$ are actuated. The logic circuit as shown in FIG. 9C produces the pulses shown in Table V by using input signals $P_1 - P_{10}$ and $\overline{0} - \overline{90}$ and these pulses are supplied to the driving circuit as the control signals for the phase A – E.

Figure 11A:
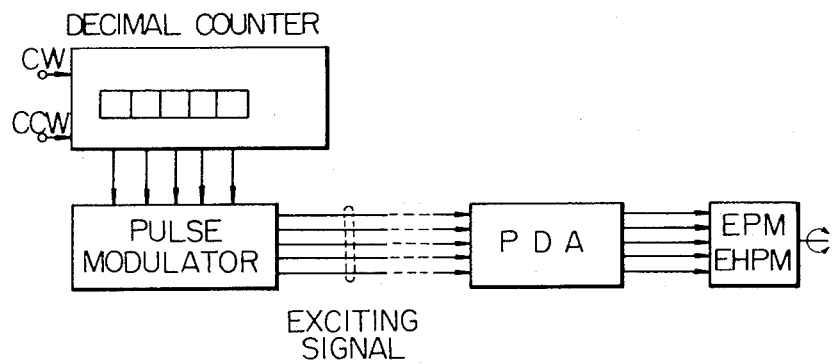
FIGS. 11A – 11B are diagrams explaining two embodiments according to the system shown in FIG. 9A.

FIG. 11A is the circuit in which the five phase pulse motor provides 100 steps by using the above-mentioned pulse modulator, a decimal counter and the alternative three-phase/two-phase excitation. An exciting truth table concerning the circuit of FIG. 11A is shown in Table V.

Figure 11B:
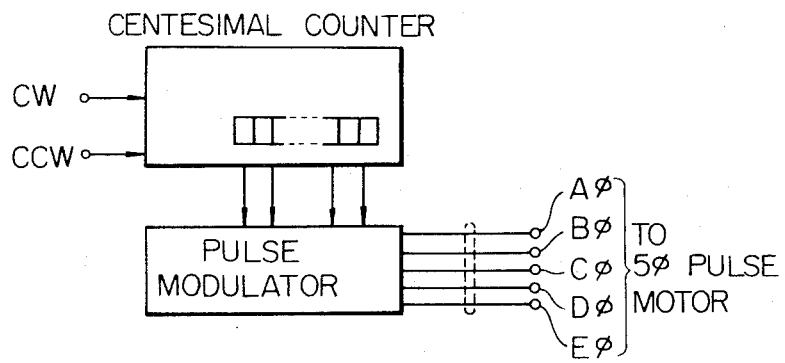

FIG. 11B is the circuit in which the five phase pulse motor provides 100 steps by using a centesimal counter and alternative one-phase/five-phase excitation. An exciting truth table concerning this circuit is shown in Table VI.

Table VII is an exciting real value table for the case of a five phase pulse motor provided with 100 steps by using a centesimal counter and maximum 1.1 phase excitation.

Table VIII is an exciting truth table for the case of a five phase pulse motor provided with 100 steps by using a centensimal counter and alternative two-phase/two-phase excitation.

Further Table IX is an exciting truth table in another case of a five phase pulse motor provided with 100 steps by using a centesimal counter and alternative two-phase/two-phase excitation.

Table V

| STEP PULSE | ESA | ESB | ESC | ESD | ESE | STEP PULSE | ESA | ESB | ESC | ESD | ESE |
|---|---|---|---|---|---|---|---|---|---|---|---|
| 0 | 10 | 10 | 10 | 0 | 0 | 26 | 0 | 4 | 10 | 10 | 0 |
| 1 | 9 | 10 | 10 | 0 | 0 | 27 | 0 | 3 | 10 | 10 | 0 |
| 2 | 8 | 10 | 10 | 0 | 0 | 28 | 0 | 2 | 10 | 10 | 0 |
| 3 | 7 | 10 | 10 | 0 | 0 | 29 | 0 | 1 | 10 | 10 | 0 |
| 4 | 6 | 10 | 10 | 0 | 0 | 30 | 0 | 0 | 10 | 10 | 0 |
| 5 | 5 | 10 | 10 | 0 | 0 | 31 | 0 | 0 | 10 | 10 | 1 |
| 6 | 4 | 10 | 10 | 0 | 0 | 32 | 0 | 0 | 10 | 10 | 2 |
| 7 | 3 | 10 | 10 | 0 | 0 | 33 | 0 | 0 | 10 | 10 | 3 |
| 8 | 2 | 10 | 10 | 0 | 0 | 34 | 0 | 0 | 10 | 10 | 4 |
| 9 | 1 | 10 | 10 | 0 | 0 | 35 | 0 | 0 | 10 | 10 | 5 |
| 10 | 0 | 10 | 10 | 0 | 0 | 36 | 0 | 0 | 10 | 10 | 6 |
| 11 | 0 | 10 | 10 | 1 | 0 | 37 | 0 | 0 | 10 | 10 | 7 |
| 12 | 0 | 10 | 10 | 2 | 0 | 38 | 0 | 0 | 10 | 10 | 8 |
| 13 | 0 | 10 | 10 | 3 | 0 | 39 | 0 | 0 | 10 | 10 | 9 |
| 14 | 0 | 10 | 10 | 4 | 0 | 40 | 0 | 0 | 10 | 10 | 10 |
| 15 | 0 | 10 | 10 | 5 | 0 | 41 | 0 | 0 | 9 | 10 | 10 |
| 16 | 0 | 10 | 10 | 6 | 0 | 42 | 0 | 0 | 8 | 10 | 10 |
| 17 | 0 | 10 | 10 | 7 | 0 | 43 | 0 | 0 | 7 | 10 | 10 |
| 18 | 0 | 10 | 10 | 8 | 0 | 44 | 0 | 0 | 6 | 10 | 10 |
| 19 | 0 | 10 | 10 | 9 | 0 | 45 | 0 | 0 | 5 | 10 | 10 |
| 20 | 0 | 10 | 10 | 10 | 0 | 46 | 0 | 0 | 4 | 10 | 10 |
| 21 | 0 | 9 | 10 | 10 | 0 | 47 | 0 | 0 | 3 | 10 | 10 |
| 22 | 0 | 8 | 10 | 10 | 0 | 48 | 0 | 0 | 2 | 10 | 10 |
| 23 | 0 | 7 | 10 | 10 | 0 | 49 | 0 | 0 | 1 | 10 | 10 |
| 24 | 0 | 6 | 10 | 10 | 0 | 50 | 0 | 0 | 0 | 10 | 10 |
| 25 | 0 | 5 | 10 | 10 | 0 | | | | | | |

Table V (continued)

| STEP PULSE | ESA | ESB | ESC | ESD | ESE | STEP PULSE | ESA | ESB | ESC | ESD | ESE |
|---|---|---|---|---|---|---|---|---|---|---|---|
| 51 | 1 | 0 | 0 | 10 | 10 | 76 | 10 | 6 | 0 | 0 | 10 |
| 52 | 2 | 0 | 0 | 10 | 10 | 77 | 10 | 7 | 0 | 0 | 10 |
| 53 | 3 | 0 | 0 | 10 | 10 | 78 | 10 | 8 | 0 | 0 | 10 |
| 54 | 4 | 0 | 0 | 10 | 10 | 79 | 10 | 9 | 0 | 0 | 10 |
| 55 | 5 | 0 | 0 | 10 | 10 | 80 | 10 | 10 | 0 | 0 | 10 |
| 56' | 6 | 0 | 0 | 10 | 10 | 81 | 10 | 10 | 0 | 0 | 9 |
| 57 | 7 | 0 | 0 | 10 | 10 | 82 | 10 | 10 | 0 | 0 | 8 |
| 58 | 8 | 0 | 0 | 10 | 10 | 83 | 10 | 10 | 0 | 0 | 7 |
| 59 | 9 | 0 | 0 | 10 | 10 | 84 | 10 | 10 | 0 | 0 | 6 |
| 60 | 10 | 0 | 0 | 10 | 10 | 85 | 10 | 10 | 0 | 0 | 5 |
| 61 | 10 | 0 | 0 | 9 | 10 | 86 | 10 | 10 | 0 | 0 | 4 |
| 62 | 10 | 0 | 0 | 8 | 10 | 87 | 10 | 10 | 0 | 0 | 3 |
| 63 | 10 | 0 | 0 | 7 | 10 | 88 | 10 | 10 | 0 | 0 | 2 |
| 64 | 10 | 0 | 0 | 6 | 10 | 89 | 10 | 10 | 0 | 0 | 1 |
| 65 | 10 | 0 | 0 | 5 | 10 | 90 | 10 | 10 | 0 | 0 | 0 |
| 66 | 10 | 0 | 0 | 4 | 10 | 91 | 10 | 10 | 1 | 0 | 0 |
| 67 | 10 | 0 | 0 | 3 | 10 | 92 | 10 | 10 | 2 | 0 | 0 |
| 68 | 10 | 0 | 0 | 2 | 10 | 93 | 10 | 10 | 3 | 0 | 0 |
| 69 | 10 | 0 | 0 | 1 | 10 | 94 | 10 | 10 | 4 | 0 | 0 |
| 70 | 10 | 0 | 0 | 0 | 10 | 95 | 10 | 10 | 5 | 0 | 0 |
| 71 | 10 | 1 | 0 | 0 | 10 | 96 | 10 | 10 | 6 | 0 | 0 |
| 72 | 10 | 2 | 0 | 0 | 10 | 97 | 10 | 10 | 7 | 0 | 0 |
| 73 | 10 | 3 | 0 | 0 | 10 | 98 | 10 | 10 | 8 | 0 | 0 |
| 74 | 10 | 4 | 0 | 0 | 10 | 99 | 10 | 10 | 9 | 0 | 0 |
| 75 | 10 | 5 | 0 | 0 | 10 | 100 | 10 | 10 | 10 | 0 | 0 |

Table VI

| STEP PULSE | ESA | ESB | ESC | ESD | ESE | STEP PULSE | ESA | ESB | ESC | ESD | ESE |
|---|---|---|---|---|---|---|---|---|---|---|---|
| 0 | 10 | 10 | 0 | 0 | 0 | 26 | 0 | 4 | 10 | 0 | 0 |
| 1 | 9 | 10 | 0 | 0 | 0 | 27 | 0 | 3 | 10 | 0 | 0 |
| 2 | 8 | 10 | 0 | 0 | 0 | 28 | 0 | 2 | 10 | 0 | 0 |
| 3 | 7 | 10 | 0 | 0 | 0 | 29 | 0 | 1 | 10 | 0 | 0 |
| 4 | 6 | 10 | 0 | 0 | 0 | 30 | 0 | 0 | 10 | 0 | 0 |
| 5 | 5 | 10 | 0 | 0 | 0 | 31 | 0 | 0 | 10 | 1 | 0 |
| 6 | 4 | 10 | 0 | 0 | 0 | 32 | 0 | 0 | 10 | 2 | 0 |
| 7 | 3 | 10 | 0 | 0 | 0 | 33 | 0 | 0 | 10 | 3 | 0 |
| 8 | 2 | 10 | 0 | 0 | 0 | 34 | 0 | 0 | 10 | 4 | 0 |
| 9 | 1 | 10 | 0 | 0 | 0 | 35 | 0 | 0 | 10 | 5 | 0 |
| 10 | 0 | 10 | 0 | 0 | 0 | 36 | 0 | 0 | 10 | 6 | 0 |
| 11 | 0 | 10 | 1 | 0 | 0 | 37 | 0 | 0 | 10 | 7 | 0 |
| 12 | 0 | 10 | 2 | 0 | 0 | 38 | 0 | 0 | 10 | 8 | 0 |
| 13 | 0 | 10 | 3 | 0 | 0 | 39 | 0 | 0 | 10 | 9 | 0 |
| 14 | 0 | 10 | 4 | 0 | 0 | 40 | 0 | 0 | 10 | 10 | 0 |
| 15 | 0 | 10 | 5 | 0 | 0 | 41 | 0 | 0 | 9 | 10 | 0 |
| 16 | 0 | 10 | 6 | 0 | 0 | 42 | 0 | 0 | 8 | 10 | 0 |
| 17 | 0 | 10 | 7 | 0 | 0 | 43 | 0 | 0 | 7 | 10 | 0 |
| 18 | 0 | 10 | 8 | 0 | 0 | 44 | 0 | 0 | 6 | 10 | 0 |
| 19 | 0 | 10 | 9 | 0 | 0 | 45 | 0 | 0 | 5 | 10 | 0 |
| 20 | 0 | 10 | 10 | 0 | 0 | 46 | 0 | 0 | 4 | 10 | 0 |
| 21 | 0 | 9 | 10 | 0 | 0 | 47 | 0 | 0 | 3 | 10 | 0 |
| 22 | 0 | 8 | 10 | 0 | 0 | 48 | 0 | 0 | 2 | 10 | 0 |
| 23 | 0 | 7 | 10 | 0 | 0 | 49 | 0 | 0 | 1 | 10 | 0 |
| 24 | 0 | 6 | 10 | 0 | 0 | 50 | 0 | 0 | 0 | 10 | 0 |
| 25 | 0 | 5 | 10 | 0 | 0 | | | | | | |

Table VI (continued)

| STEP PULSE | ESA | ESB | ESC | ESD | ESE | STEP PULSE | ESA | ESB | ESC | ESD | ESE |
|---|---|---|---|---|---|---|---|---|---|---|---|
| 51 | 0 | 0 | 0 | 10 | 1 | 76 | 6 | 0 | 0 | 0 | 10 |
| 52 | 0 | 0 | 0 | 10 | 2 | 77 | 7 | 0 | 0 | 0 | 10 |
| 53 | 0 | 0 | 0 | 10 | 3 | 78 | 8 | 0 | 0 | 0 | 10 |
| 54 | 0 | 0 | 0 | 10 | 4 | 79 | 9 | 0 | 0 | 0 | 10 |
| 55 | 0 | 0 | 0 | 10 | 5 | 80 | 10 | 0 | 0 | 0 | 10 |
| 56 | 0 | 0 | 0 | 10 | 6 | 81 | 10 | 0 | 0 | 0 | 9 |
| 57 | 0 | 0 | 0 | 10 | 7 | 82 | 10 | 0 | 0 | 0 | 8 |
| 58 | 0 | 0 | 0 | 10 | 8 | 83 | 10 | 0 | 0 | 0 | 7 |
| 59 | 0 | 0 | 0 | 10 | 9 | 84 | 10 | 0 | 0 | 0 | 6 |
| 60 | 0 | 0 | 0 | 10 | 10 | 85 | 10 | 0 | 0 | 0 | 5 |
| 61 | 0 | 0 | 0 | 9 | 10 | 86 | 10 | 0 | 0 | 0 | 4 |
| 62 | 0 | 0 | 0 | 8 | 10 | 87 | 10 | 0 | 0 | 0 | 3 |
| 63 | 0 | 0 | 0 | 7 | 10 | 88 | 10 | 0 | 0 | 0 | 2 |
| 64 | 0 | 0 | 0 | 6 | 10 | 89 | 10 | 0 | 0 | 0 | 1 |
| 65 | 0 | 0 | 0 | 5 | 10 | 90 | 10 | 0 | 0 | 0 | 0 |
| 66 | 0 | 0 | 0 | 4 | 10 | 91 | 10 | 1 | 0 | 0 | 0 |
| 67 | 0 | 0 | 0 | 3 | 10 | 92 | 10 | 2 | 0 | 0 | 0 |
| 68 | 0 | 0 | 0 | 2 | 10 | 93 | 10 | 3 | 0 | 0 | 0 |
| 69 | 0 | 0 | 0 | 1 | 10 | 94 | 10 | 4 | 0 | 0 | 0 |
| 70 | 0 | 0 | 0 | 0 | 10 | 95 | 10 | 5 | 0 | 0 | 0 |
| 71 | 1 | 0 | 0 | 0 | 10 | 96 | 10 | 6 | 0 | 0 | 0 |
| 72 | 2 | 0 | 0 | 0 | 10 | 97 | 10 | 7 | 0 | 0 | 0 |
| 73 | 3 | 0 | 0 | 0 | 10 | 98 | 10 | 8 | 0 | 0 | 0 |
| 74 | 4 | 0 | 0 | 0 | 10 | 99 | 10 | 9 | 0 | 0 | 0 |
| 75 | 5 | 0 | 0 | 0 | 10 | 100 | 10 | 10 | 0 | 0 | 0 |

Table VII

| STEP PULSE | ESA | ESB | ESC | ESD | ESE | STEP PULSE | ESA | ESB | ESC | ESD | ESE |
|---|---|---|---|---|---|---|---|---|---|---|---|
| 0 | 10 | 0 | 0 | 0 | 0 | 26 | 0 | 7 | 3 | 0 | 0 |
| 1 | 10 | 1 | 0 | 0 | 0 | 27 | 0 | 7 | 4 | 0 | 0 |
| 2 | 9 | 1 | 0 | 0 | 0 | 28 | 0 | 6 | 4 | 0 | 0 |
| 3 | 9 | 2 | 0 | 0 | 0 | 29 | 0 | 6 | 5 | 0 | 0 |
| 4 | 8 | 2 | 0 | 0 | 0 | 30 | 0 | 5 | 5 | 0 | 0 |
| 5 | 8 | 3 | 0 | 0 | 0 | 31 | 0 | 5 | 6 | 0 | 0 |
| 6 | 7 | 3 | 0 | 0 | 0 | 32 | 0 | 4 | 6 | 0 | 0 |
| 7 | 7 | 4 | 0 | 0 | 0 | 33 | 0 | 4 | 7 | 0 | 0 |
| 8 | 6 | 4 | 0 | 0 | 0 | 34 | 0 | 3 | 7 | 0 | 0 |
| 9 | 6 | 5 | 0 | 0 | 0 | 35 | 0 | 3 | 8 | 0 | 0 |
| 10 | 5 | 5 | 0 | 0 | 0 | 36 | 0 | 2 | 8 | 0 | 0 |
| 11 | 5 | 6 | 0 | 0 | 0 | 37 | 0 | 2 | 9 | 0 | 0 |
| 12 | 4 | 6 | 0 | 0 | 0 | 38 | 0 | 1 | 9 | 0 | 0 |
| 13 | 4 | 7 | 0 | 0 | 0 | 39 | 0 | 1 | 10 | 0 | 0 |
| 14 | 3 | 7 | 0 | 0 | 0 | 40 | 0 | 0 | 10 | 0 | 0 |
| 15 | 3 | 8 | 0 | 0 | 0 | 41 | 0 | 0 | 10 | 1 | 0 |
| 16 | 2 | 8 | 0 | 0 | 0 | 42 | 0 | 0 | 9 | 1 | 0 |
| 17 | 2 | 9 | 0 | 0 | 0 | 43 | 0 | 0 | 9 | 2 | 0 |
| 18 | 1 | 9 | 0 | 0 | 0 | 44 | 0 | 0 | 8 | 2 | 0 |
| 19 | 1 | 10 | 0 | 0 | 0 | 45 | 0 | 0 | 8 | 3 | 0 |
| 20 | 0 | 10 | 0 | 0 | 0 | 46 | 0 | 0 | 7 | 3 | 0 |
| 21 | 0 | 10 | 1 | 0 | 0 | 47 | 0 | 0 | 7 | 4 | 0 |
| 22 | 0 | 9 | 1 | 0 | 0 | 48 | 0 | 0 | 6 | 4 | 0 |
| 23 | 0 | 9 | 2 | 0 | 0 | 49 | 0 | 0 | 6 | 5 | 0 |
| 24 | 0 | 8 | 2 | 0 | 0 | 50 | 0 | 0 | 5 | 5 | 0 |
| 25 | 0 | 8 | 3 | 0 | 0 | | | | | | |

Table VII (continued)

| STEP PULSE | ESA | ESB | ESC | ESD | ESE | STEP PULSE | ESA | ESB | ESC | ESD | ESE |
|---|---|---|---|---|---|---|---|---|---|---|---|
| 51 | 0 | 0 | 5 | 6 | 0 | 76 | 0 | 0 | 0 | 2 | 8 |
| 52 | 0 | 0 | 4 | 6 | 0 | 77 | 0 | 0 | 0 | 2 | 9 |
| 53 | 0 | 0 | 4 | 7 | 0 | 78 | 0 | 0 | 0 | 1 | 9 |
| 54 | 0 | 0 | 3 | 7 | 0 | 79 | 0 | 0 | 0 | 1 | 10 |
| 55 | 0 | 0 | 3 | 8 | 0 | 80 | 0 | 0 | 0 | 0 | 10 |
| 56 | 0 | 0 | 2 | 8 | 0 | 81 | 1 | 0 | 0 | 0 | 10 |
| 57 | 0 | 0 | 2 | 9 | 0 | 82 | 1 | 0 | 0 | 0 | 9 |
| 58 | 0 | 0 | 1 | 9 | 0 | 83 | 2 | 0 | 0 | 0 | 9 |
| 59 | 0 | 0 | 1 | 10 | 0 | 84 | 2 | 0 | 0 | 0 | 8 |
| 60 | 0 | 0 | 0 | 10 | 0 | 85 | 3 | 0 | 0 | 0 | 8 |
| 61 | 0 | 0 | 0 | 10 | 1 | 86 | 3 | 0 | 0 | 0 | 7 |
| 62 | 0 | 0 | 0 | 9 | 1 | 87 | 4 | 0 | 0 | 0 | 7 |
| 63 | 0 | 0 | 0 | 9 | 2 | 88 | 4 | 0 | 0 | 0 | 6 |
| 64 | 0 | 0 | 0 | 8 | 2 | 89 | 5 | 0 | 0 | 0 | 6 |
| 65 | 0 | 0 | 0 | 8 | 3 | 90 | 5 | 0 | 0 | 0 | 5 |
| 66 | 0 | 0 | 0 | 7 | 3 | 91 | 6 | 0 | 0 | 0 | 5 |
| 67 | 0 | 0 | 0 | 7 | 4 | 92 | 6 | 0 | 0 | 0 | 4 |
| 68 | 0 | 0 | 0 | 6 | 4 | 93 | 7 | 0 | 0 | 0 | 4 |
| 69 | 0 | 0 | 0 | 6 | 5 | 94 | 7 | 0 | 0 | 0 | 3 |
| 70 | 0 | 0 | 0 | 5 | 5 | 95 | 8 | 0 | 0 | 0 | 3 |
| 71 | 0 | 0 | 0 | 5 | 6 | 96 | 8 | 0 | 0 | 0 | 2 |
| 72 | 0 | 0 | 0 | 4 | 6 | 97 | 9 | 0 | 0 | 0 | 2 |
| 73 | 0 | 0 | 0 | 4 | 7 | 98 | 9 | 0 | 0 | 0 | 1 |
| 74 | 0 | 0 | 0 | 3 | 7 | 99 | 10 | 0 | 0 | 0 | 1 |
| 75 | 0 | 0 | 0 | 3 | 8 | 100 | 10 | 0 | 0 | 0 | 0 |

Table VIII

| STEP PULSE | ESA | ESB | ESC | ESD | ESE | STEP PULSE | ESA | ESB | ESC | ESD | ESE |
|---|---|---|---|---|---|---|---|---|---|---|---|
| 0 | 10 | 10 | 0 | 0 | 0 | 26 | 0 | 7 | 10 | 3 | 0 |
| 1 | 10 | 10 | 1 | 0 | 0 | 27 | 0 | 7 | 10 | 4 | 0 |
| 2 | 9 | 10 | 1 | 0 | 0 | 28 | 0 | 6 | 10 | 4 | 0 |
| 3 | 9 | 10 | 2 | 0 | 0 | 29 | 0 | 6 | 10 | 5 | 0 |
| 4 | 8 | 10 | 2 | 0 | 0 | 30 | 0 | 5 | 10 | 5 | 0 |
| 5 | 8 | 10 | 3 | 0 | 0 | 31 | 0 | 5 | 10 | 6 | 0 |
| 6 | 7 | 10 | 3 | 0 | 0 | 32 | 0 | 4 | 10 | 6 | 0 |
| 7 | 7 | 10 | 4 | 0 | 0 | 33 | 0 | 4 | 10 | 7 | 0 |
| 8 | 6 | 10 | 4 | 0 | 0 | 34 | 0 | 3 | 10 | 7 | 0 |
| 9 | 6 | 10 | 5 | 0 | 0 | 35 | 0 | 3 | 10 | 8 | 0 |
| 10 | 5 | 10 | 5 | 0 | 0 | 36 | 0 | 2 | 10 | 8 | 0 |
| 11 | 5 | 10 | 6 | 0 | 0 | 37 | 0 | 2 | 10 | 9 | 0 |
| 12 | 4 | 10 | 6 | 0 | 0 | 38 | 0 | 1 | 10 | 9 | 0 |
| 13 | 4 | 10 | 7 | 0 | 0 | 39 | 0 | 1 | 10 | 10 | 0 |
| 14 | 3 | 10 | 7 | 0 | 0 | 40 | 0 | 0 | 10 | 10 | 0 |
| 15 | 3 | 10 | 8 | 0 | 0 | 41 | 0 | 0 | 10 | 10 | 1 |
| 16 | 2 | 10 | 8 | 0 | 0 | 42 | 0 | 0 | 9 | 10 | 1 |
| 17 | 2 | 10 | 9 | 0 | 0 | 43 | 0 | 0 | 9 | 10 | 2 |
| 18 | 1 | 10 | 9 | 0 | 0 | 44 | 0 | 0 | 8 | 10 | 2 |
| 19 | 1 | 10 | 10 | 0 | 0 | 45 | 0 | 0 | 8 | 10 | 3 |
| 20 | 0 | 10 | 10 | 0 | 0 | 46 | 0 | 0 | 7 | 10 | 3 |
| 21 | 0 | 10 | 10 | 1 | 0 | 47 | 0 | 0 | 7 | 10 | 4 |
| 22 | 0 | 9 | 10 | 1 | 0 | 48 | 0 | 0 | 6 | 10 | 4 |
| 23 | 0 | 9 | 10 | 2 | 0 | 49 | 0 | 0 | 6 | 10 | 5 |
| 24 | 0 | 8 | 10 | 2 | 0 | 50 | 0 | 0 | 5 | 10 | 5 |
| 25 | 0 | 8 | 10 | 3 | 0 | | | | | | |

Table VIII (continued)

| STEP PULSE | ESA | ESB | ESC | ESD | ESE | STEP PULSE | ESA | ESB | ESC | ESD | ESE |
|---|---|---|---|---|---|---|---|---|---|---|---|
| 51 | 0 | 0 | 5 | 10 | 6 | 76 | 10 | 0 | 0 | 4 | 10 |
| 52 | 0 | 0 | 5 | 10 | 7 | 77 | 10 | 0 | 0 | 3 | 10 |
| 53 | 0 | 0 | 5 | 10 | 8 | 78 | 10 | 0 | 0 | 2 | 10 |
| 54 | 0 | 0 | 5 | 10 | 9 | 79 | 10 | 0 | 0 | 1 | 10 |
| 55 | 0 | 0 | 5 | 10 | 10 | 80 | 10 | 0 | 0 | 0 | 10 |
| 56 | 0 | 0 | 4 | 10 | 10 | 81 | 10 | 1 | 0 | 0 | 10 |
| 57 | 0 | 0 | 3 | 10 | 10 | 82 | 10 | 2 | 0 | 0 | 10 |
| 58 | 0 | 0 | 2 | 10 | 10 | 83 | 10 | 3 | 0 | 0 | 10 |
| 59 | 0 | 0 | 1 | 10 | 10 | 84 | 10 | 4 | 0 | 0 | 10 |
| 60 | 0 | 0 | 0 | 10 | 10 | 85 | 10 | 5 | 0 | 0 | 10 |
| 61 | 1 | 0 | 0 | 10 | 10 | 86 | 10 | 5 | 0 | 0 | 9 |
| 62 | 2 | 0 | 0 | 10 | 10 | 87 | 10 | 5 | 0 | 0 | 8 |
| 63 | 3 | 0 | 0 | 10 | 10 | 88 | 10 | 5 | 0 | 0 | 7 |
| 64 | 4 | 0 | 0 | 10 | 10 | 89 | 10 | 5 | 0 | 0 | 6 |
| 65 | 5 | 0 | 0 | 10 | 10 | 90 | 10 | 5 | 0 | 0 | 5 |
| 66 | 5 | 0 | 0 | 9 | 10 | 91 | 10 | 6 | 0 | 0 | 5 |
| 67 | 5 | 0 | 0 | 8 | 10 | 92 | 10 | 7 | 0 | 0 | 5 |
| 68 | 5 | 0 | 0 | 7 | 10 | 93 | 10 | 8 | 0 | 0 | 5 |
| 69 | 5 | 0 | 0 | 6 | 10 | 94 | 10 | 9 | 0 | 0 | 5 |
| 70 | 5 | 0 | 0 | 5 | 10 | 95 | 10 | 10 | 0 | 0 | 5 |
| 71 | 6 | 0 | 0 | 5 | 10 | 96 | 10 | 10 | 0 | 0 | 4 |
| 72 | 7 | 0 | 0 | 5 | 10 | 97 | 10 | 10 | 0 | 0 | 3 |
| 73 | 8 | 0 | 0 | 5 | 10 | 98 | 10 | 10 | 0 | 0 | 2 |
| 74 | 9 | 0 | 0 | 5 | 10 | 99 | 10 | 10 | 0 | 0 | 1 |
| 75 | 10 | 0 | 0 | 5 | 10 | 100 | 10 | 10 | 0 | 0 | 0 |

Table IX

| STEP PULSE | ESA | ESB | ESC | ESD | ESE | STEP PULSE | ESA | ESB | ESC | ESD | ESE |
|---|---|---|---|---|---|---|---|---|---|---|---|
| 0 | 10 | 10 | 0 | 0 | 0 | 26 | 0 | 9 | 10 | 5 | 0 |
| 1 | 10 | 10 | 1 | 0 | 0 | 27 | 0 | 8 | 10 | 5 | 0 |
| 2 | 10 | 10 | 2 | 0 | 0 | 28 | 0 | 7 | 10 | 5 | 0 |
| 3 | 10 | 10 | 3 | 0 | 0 | 29 | 0 | 6 | 10 | 5 | 0 |
| 4 | 10 | 10 | 4 | 0 | 0 | 30 | 0 | 5 | 10 | 5 | 0 |
| 5 | 10 | 10 | 5 | 0 | 0 | 31 | 0 | 5 | 10 | 6 | 0 |
| 6 | 9 | 10 | 5 | 0 | 0 | 32 | 0 | 5 | 10 | 7 | 0 |
| 7 | 8 | 10 | 5 | 0 | 0 | 33 | 0 | 5 | 10 | 8 | 0 |
| 8 | 7 | 10 | 5 | 0 | 0 | 34 | 0 | 5 | 10 | 9 | 0 |
| 9 | 6 | 10 | 5 | 0 | 0 | 35 | 0 | 5 | 10 | 10 | 0 |
| 10 | 5 | 10 | 5 | 0 | 0 | 36 | 0 | 4 | 10 | 10 | 0 |
| 11 | 5 | 10 | 6 | 0 | 0 | 37 | 0 | 3 | 10 | 10 | 0 |
| 12 | 5 | 10 | 7 | 0 | 0 | 38 | 0 | 2 | 10 | 10 | 0 |
| 13 | 5 | 10 | 8 | 0 | 0 | 39 | 0 | 1 | 10 | 10 | 0 |
| 14 | 5 | 10 | 9 | 0 | 0 | 40 | 0 | 0 | 10 | 10 | 0 |
| 15 | 5 | 10 | 10 | 0 | 0 | 41 | 0 | 0 | 10 | 10 | 1 |
| 16 | 4 | 10 | 10 | 0 | 0 | 42 | 0 | 0 | 10 | 10 | 2 |
| 17 | 3 | 10 | 10 | 0 | 0 | 43 | 0 | 0 | 10 | 10 | 3 |
| 18 | 2 | 10 | 10 | 0 | 0 | 44 | 0 | 0 | 10 | 10 | 4 |
| 19 | 1 | 10 | 10 | 0 | 0 | 45 | 0 | 0 | 10 | 10 | 5 |
| 20 | 0 | 10 | 10 | 0 | 0 | 46 | 0 | 0 | 9 | 10 | 5 |
| 21 | 0 | 10 | 10 | 1 | 0 | 47 | 0 | 0 | 8 | 10 | 5 |
| 22 | 0 | 10 | 10 | 2 | 0 | 48 | 0 | 0 | 7 | 10 | 5 |
| 23 | 0 | 10 | 10 | 3 | 0 | 49 | 0 | 0 | 6 | 10 | 5 |
| 24 | 0 | 10 | 10 | 4 | 0 | 50 | 0 | 0 | 5 | 10 | 5 |
| 25 | 0 | 10 | 10 | 5 | 0 | | | | | | |

Table IX (continued)

| STEP PULSE | ESA | ESB | ESC | ESD | ESE | STEP PULSE | ESA | ESB | ESC | ESD | ESE |
|---|---|---|---|---|---|---|---|---|---|---|---|
| 51 | 0 | 0 | 5 | 10 | 6 | 76 | 8 | 0 | 0 | 2 | 10 |
| 52 | 0 | 0 | 4 | 10 | 6 | 77 | 9 | 0 | 0 | 2 | 10 |
| 53 | 0 | 0 | 4 | 10 | 7 | 78 | 9 | 0 | 0 | 1 | 10 |
| 54 | 0 | 0 | 3 | 10 | 7 | 79 | 10 | 0 | 0 | 1 | 10 |
| 55 | 0 | 0 | 3 | 10 | 8 | 80 | 10 | 0 | 0 | 0 | 10 |
| 56 | 0 | 0 | 2 | 10 | 8 | 81 | 10 | 1 | 0 | 0 | 10 |
| 57 | 0 | 0 | 2 | 10 | 9 | 82 | 10 | 1 | 0 | 0 | 9 |
| 58 | 0 | 0 | 1 | 10 | 9 | 83 | 10 | 2 | 0 | 0 | 9 |
| 59 | 0 | 0 | 1 | 10 | 10 | 84 | 10 | 2 | 0 | 0 | 8 |
| 60 | 0 | 0 | 0 | 10 | 10 | 85 | 10 | 3 | 0 | 0 | 8 |
| 61 | 1 | 0 | 0 | 10 | 10 | 86 | 10 | 3 | 0 | 0 | 7 |
| 62 | 1 | 0 | 0 | 9 | 10 | 87 | 10 | 4 | 0 | 0 | 7 |
| 63 | 2 | 0 | 0 | 9 | 10 | 88 | 10 | 4 | 0 | 0 | 6 |
| 64 | 2 | 0 | 0 | 8 | 10 | 89 | 10 | 5 | 0 | 0 | 6 |
| 65 | 3 | 0 | 0 | 8 | 10 | 90 | 10 | 5 | 0 | 0 | 5 |
| 66 | 3 | 0 | 0 | 7 | 10 | 91 | 10 | 6 | 0 | 0 | 5 |
| 67 | 4 | 0 | 0 | 7 | 10 | 92 | 10 | 6 | 0 | 0 | 4 |
| 68 | 4 | 0 | 0 | 6 | 10 | 93 | 10 | 7 | 0 | 0 | 4 |
| 69 | 5 | 0 | 0 | 6 | 10 | 94 | 10 | 7 | 0 | 0 | 3 |
| 70 | 5 | 0 | 0 | 5 | 10 | 95 | 10 | 8 | 0 | 0 | 3 |
| 71 | 6 | 0 | 0 | 5 | 10 | 96 | 10 | 8 | 0 | 0 | 2 |
| 72 | 6 | 0 | 0 | 4 | 10 | 97 | 10 | 9 | 0 | 0 | 2 |
| 73 | 7 | 0 | 0 | 4 | 10 | 98 | 10 | 9 | 0 | 0 | 1 |
| 74 | 7 | 0 | 0 | 3 | 10 | 99 | 10 | 10 | 0 | 0 | 1 |
| 75 | 8 | 0 | 0 | 3 | 10 | 100 | 10 | 10 | 0 | 0 | 0 |

The circuits in the case of Table VII ~ IX have the same construction as in FIG. 11B. In the case of a five phase pulse motor, the torque obtained has a maximum value at 2.5 phase excitation.

In the above-mentioned example, the pulse motor drive circuit provides respectively the multistable exciting circuit 26 for the purpose of providing a predetermined control pulse. However, this multistable exciting circuit 26 has a very complex construction, and it is very troublesome to provide one multistable exciting circuit for each pulse motor and the cost is very high. In this case, it is very convenient and common to utilize a memory circuit for driving the multi pulse motor and this memory circuit can store a sequence of excitations for the pulse motor. The embodiment of this example is shown in FIG. 12.

Referring to FIG. 12, a control counter 27 counts an input clock pulse CL, and the output of the control counter 27 is applied to a control signal generator 28. The control signal Tn from the control signal generator 28 is applied to an arithmetic circuit 29, a write control circuit 30, a memory circuit 31 and a series-parallel converter 32. The momery circuit 31 stores other control information and all addresses of the memory circuit 31 are scanned by the control signal from the control signal generator 28 and the content of the memory circuit is read out in order. The information An which is read out is applied to the series-parallel converter 32, the arithmetic circuit 29, and the write control circuit 30. The informations An which are read in series manner are converted to parallel control signals by the series-parallel converter 32 and said converter parallel control signals are supplied via a transformer 33 having an electro-static shield to the driving elements A1PD ~ D5PD of the pulse motors $PM_a$ ~ $PM_d$. Each pulse motor is provided with respectively the exciting coil A1L ~ A5L, B1L ~ B5L, C1L ~ D5L. The arithmetic circuit 29 receives the control information for the forward direction +A ~ +D and for reverse direction −A ~ −D of each pulse motor, and the results of the arithmetic circuit 29 are supplied to the write control circuit 30 and written by the write signal WP in the predetermined position of the memory circuit 31. When five pulse are used, the memory circuit 31 is composed of five shift registers and the shifted signals are supplied via the series-parallel converter 32, the transformer 33 to the driving elements A1PD ~ D5PD. Further, the signals which are read from each shift register are written via the arithmetic circuit 29 and the write control circuit 30 to another shift register for the purpose of carrying out the above-mentioned alternative two-phase/three-phase excitation. As a result of this, the excitation of the pulse motor is controlled in accordance with, for example, the sequence in the above-mentioned Table I. The memory circuit 31 acts as a common circuit for a plurality of the pulse motors $PM_a$ ~ $PM_d$ and can be composed of simple elements such as shift registers, and thus is advantageous for many pulse motors.

Figure 13:
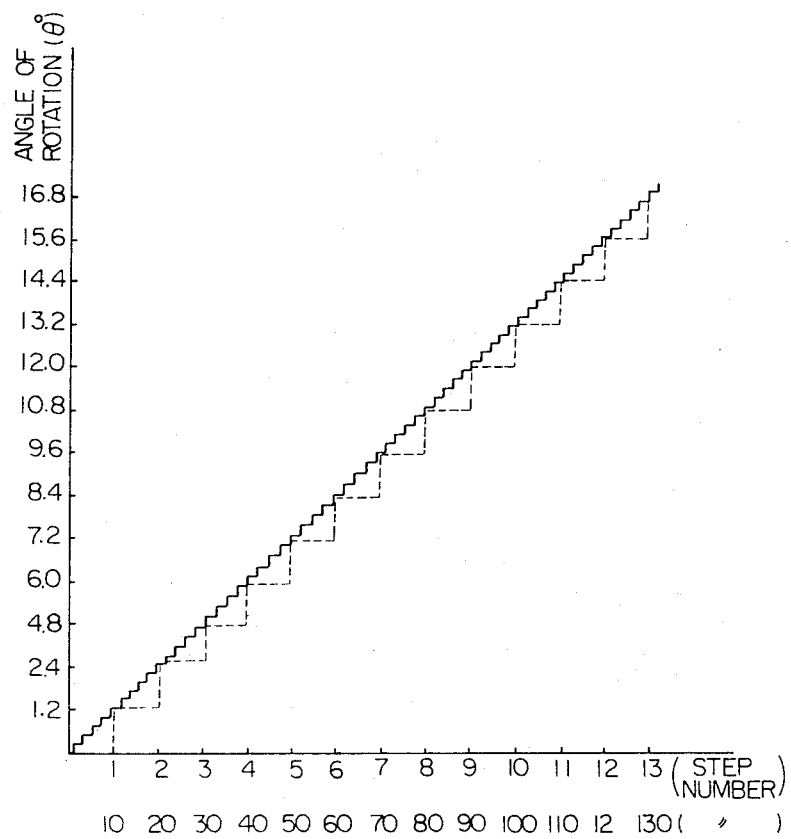
FIGS. 13 to 15 are diagrams comparing the system according to the present invention with the conventional system.
Figure 14:
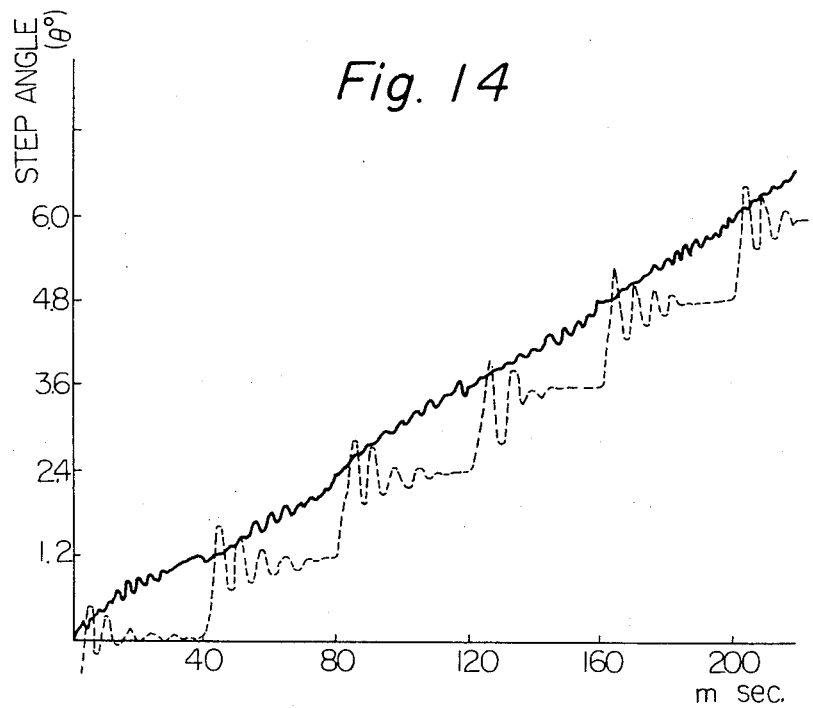
Figure 15:
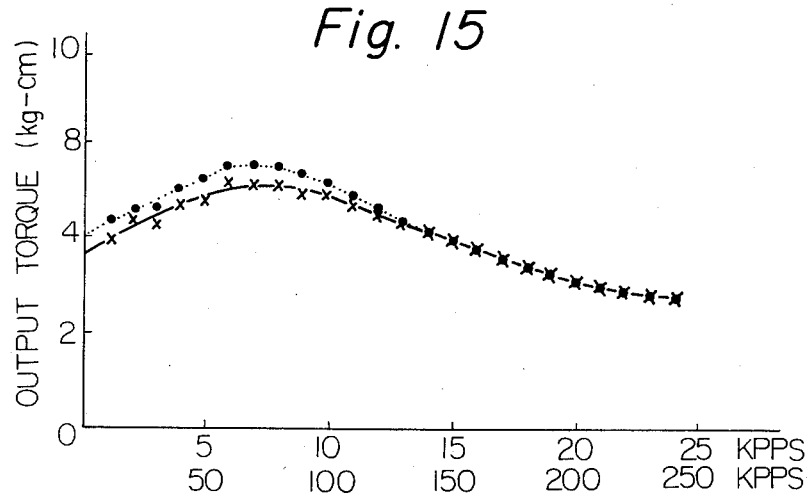

The result of an experiment in which the pulse motor is driven in accordance with the present invention is shown below. FIG. 13 is a diagram showing the relation between the number of steps and the angle of rotation wherein a dotted line shows the case of the conventional system and the full line shows the case according to the present invention. As is clearly shown in FIG. 13, the step motion of the pulse motor according to the system of the present invention is in a continuation of very fine steps and is very similar to the motion of a DC motor, thereby smoothness and precise working can be achieved. FIG. 14 is the response characteristics of the pulse motor wherein the abscissa represents the time and the ordinate represents the step angle. In the method of the conventional system, as shown by the dotted line, a vibration having a large amplitude is generated until the state becomes stable and a comparatively long time is required for the above-mentioned vibration to be sufficiently attenuated. According to the present invention, as can be seen by the full lines, each step is very fine and is accompanied by no vibration and the step angle varies continuously. FIG. 15 shows the torque characteristics wherein the abscissa represents a torque and the ordinate represents a repetition frequency of the pulse, the full line shows the case according to the present invention and the dotted line shows the case according to the conventional method. In the abscissa of FIG. 15, the figures shown in the upper column represent the number of pulses according to the conventional method and the figures of the lower column represent the number of pulses according to the system of the present invention. In the present example, the step magnitude per 10 pulses corresponds to the step magnitude per one pulse in the conventional method. As is clearly shown in this figure, the output torque of the present system is not changed in the conventional method. The variation of the exciting current between each step pulse is very small as shown in the above mentioned tables, and pulsation which is produced in the conventional method is not produced.

Figure 16:
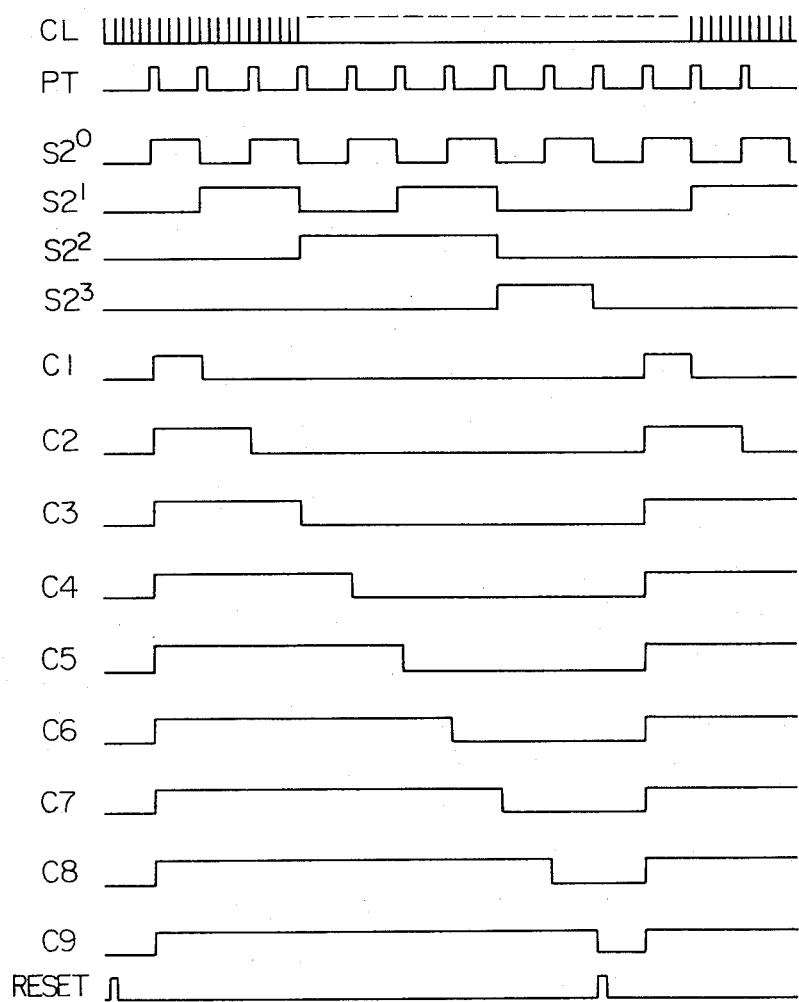
FIG. 16 is a diagram explaining the pulse waveforms in the circuit of FIG. 6 when the decimal counter is reset.
Figure 17:
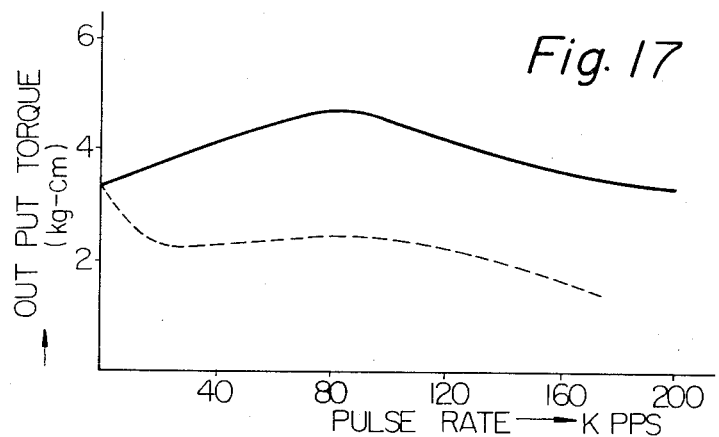
FIG. 17 is a diagram showing the torque characteristic curve.

In FIG. 6, the input step pulse CW or CCW and the output pulse of the decoder $C_1$ ~ $C_2$ are produced logically in the gate $AND_3$. Then, if the input step pulse and the output pulse of the gate circuit are not synchronized with each other, the exciting current of the pulse motor sometimes becomes large and sometimes small, because portions which are not superimposed on each other do not appear. When the pulse motor is used in the high speed region, this phenomenon becomes significant, and the torque decreases and vibration is generated in the high speed region. For removing this drawback, the input step pulses CW or CCW are taken out from the or circuit $OR_6$ and the binary counter 15 is reset. As a result of this, the initial starting points of the output of the decoder $C_1$ ~ $C_n$ are arranged in line and synchronized as shown in FIG. 16. Also, in FIG. 16, the decimal counter is used as the binary counter shown in FIG. 6, and is reset every 10 pulses of input pulse $T_o$. By applying the above-mentioned synchronization, the pulses on the output line 1 n of the N bit counter and the series of pulses $C_1$ ~ $C_n$ are coincident in time and variation of the exciting current is avoided. FIG. 17 is a diagram showing the difference in characteristics between the cases of applying the synchronization and not applying the synchronization to the circuit shown in FIG. 6. Referring to FIG. 17, the abscissa represents the torque and the ordinate represents the pulse rate. As shown in this figure, it is clear that a larger amount of output torque is obtained in the case of applying synchronization.

Figure 18A:
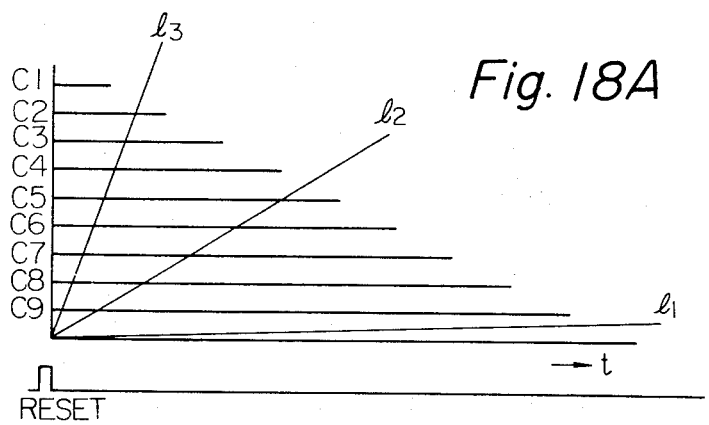
FIGS. 18A–18B are diagrams explaining reset conditions at high speed in the system of the present invention.
Figure 18B:
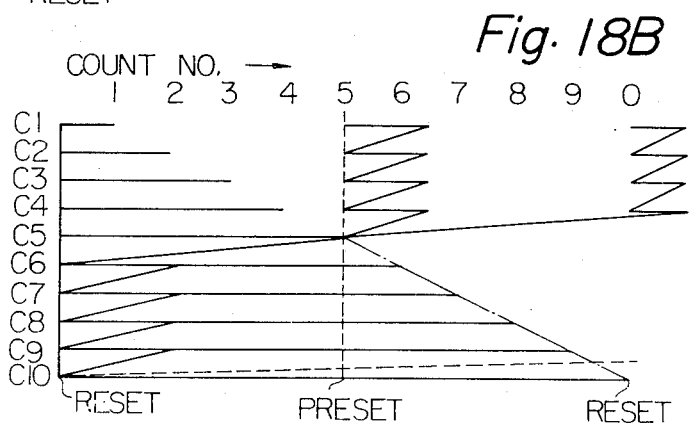

However, if the above-mentioned reset is effected every time the input step pulse is applied, it becomes clear that in the high speed region, alternative two-phase/three-phase excitation becomes, for example, three-phase excitation and thereby the efficiency and the response suffer. The phenomenon can be explained as follows. FIG. 18A shows the relation between the pulse width of the sequence of pulse $C_1$ ~ $C_{10}$ of the decoder and the pulse interval. Referring to this figure, the interval between each pulse can be represented by the straight line $l_1 \sim l_3$, etc. In the low speed region, this straight line, for example $l_1$ is not intersected by any pulses $C_1 \sim C_9$, the reset pulse is applied as above and the excitation of the pulse motor is carried out as shown in, for example, Table II. However, in the high speed region, this straight line, for example $l_2$ or $l_3$ is intersected by, for example, $C_2$ or $C_3$ having an intermediate pulse width, and the reset is effected at this point. As a result of this, full excitation conditions are realized for a pulse wider than these pulses, whereby alternative two-phase/three-phase excitation changes to three-phase excitation. For avoiding this phenomenon, as shown in FIG. 18B, taking pulse $C_5$, for example, as a reference, the reset is effected for a pulse wider than pulse $C_5$, and for any other pulse not wider, the preset is brought to zero. As mentioned above, the exciting truth table shown in Table II is modified in Table X, thus the alternative three-phase/two-phase excitation can be maintained. Table X shows only some parts of Table II, the other parts not shown are similar.

In this example, the pulses 1 ~ 10 the rise times of which are coincident with the counter output $C_1 \sim C_{32}$ shown in FIG. 19 are supplied to the pulse motor driving circuit as a chopper control input. When the signal 10 is applied and the excitation of the pulse motor reaches a predetermined current, CH is cut off at the point $CH_1$ and synchronizes with the exciting signal.

Table X

|  | Step | ESA Low | ESA High | ESB Low | ESB High | ESC Low | ESC High | ESD Low | ESD High | ESE Low | ESE High |
|---|---|---|---|---|---|---|---|---|---|---|---|
| Reset by every pulse | 0 | 10 | 10 | 10 | 10 | 10 | 10 | 0 | 0 | 0 | 0 |
|  | 1 | 9 | 10 | 10 | 10 | 10 | 10 | 0 | 0 | 0 | 0 |
|  | 2 | 8 | 10 | 10 | 10 | 10 | 10 | 0 | 0 | 0 | 0 |
|  | 3 | 7 | 10 | 10 | 10 | 10 | 10 | 0 | 0 | 0 | 0 |
|  | 4 | 6 | 10 | 10 | 10 | 10 | 10 | 0 | 0 | 0 | 0 |
| Set by every pulse | 5 | 5 | 0 | 10 | 10 | 10 | 10 | 0 | 0 | 0 | 0 |
|  | 6 | 4 | 0 | 10 | 10 | 10 | 10 | 0 | 0 | 0 | 0 |
|  | 7 | 3 | 0 | 10 | 10 | 10 | 10 | 0 | 0 | 0 | 0 |
|  | 8 | 2 | 0 | 10 | 10 | 10 | 10 | 0 | 0 | 0 | 0 |
|  | 9 | 1 | 0 | 10 | 10 | 10 | 10 | 0 | 0 | 0 | 0 |
|  | 10 | 0 | 0 | 10 | 10 | 10 | 10 | 0 | 0 | 0 | 0 |
| Set by every pulse | 11 | 0 | 0 | 10 | 10 | 10 | 10 | 1 | 0 | 0 | 0 |
|  | 12 | 0 | 0 | 10 | 10 | 10 | 10 | 2 | 0 | 0 | 0 |
|  | 13 | 0 | 0 | 10 | 10 | 10 | 10 | 3 | 0 | 0 | 0 |
|  | 14 | 0 | 0 | 10 | 10 | 10 | 10 | 4 | 0 | 0 | 0 |
|  | 15 | 0 | 0 | 10 | 10 | 10 | 10 | 5 | 0 | 0 | 0 |

Table X (continued)

|  | Step | ESA Low | ESA High | ESB Low | ESB High | ESC Low | ESC High | ESD Low | ESD High | ESE Low | ESE High |
|---|---|---|---|---|---|---|---|---|---|---|---|
| Reset by every pulse | 16 | 0 | 0 | 10 | 10 | 10 | 10 | 6 | 10 | 0 | 0 |
|  | 17 | 0 | 0 | 10 | 10 | 10 | 10 | 7 | 10 | 0 | 0 |
|  | 18 | 0 | 0 | 10 | 10 | 10 | 10 | 8 | 10 | 0 | 0 |
|  | 19 | 0 | 0 | 10 | 10 | 10 | 10 | 9 | 10 | 0 | 0 |
|  | 20 | 0 | 0 | 10 | 10 | 10 | 10 | 10 | 10 | 0 | 0 |

Figure 20:
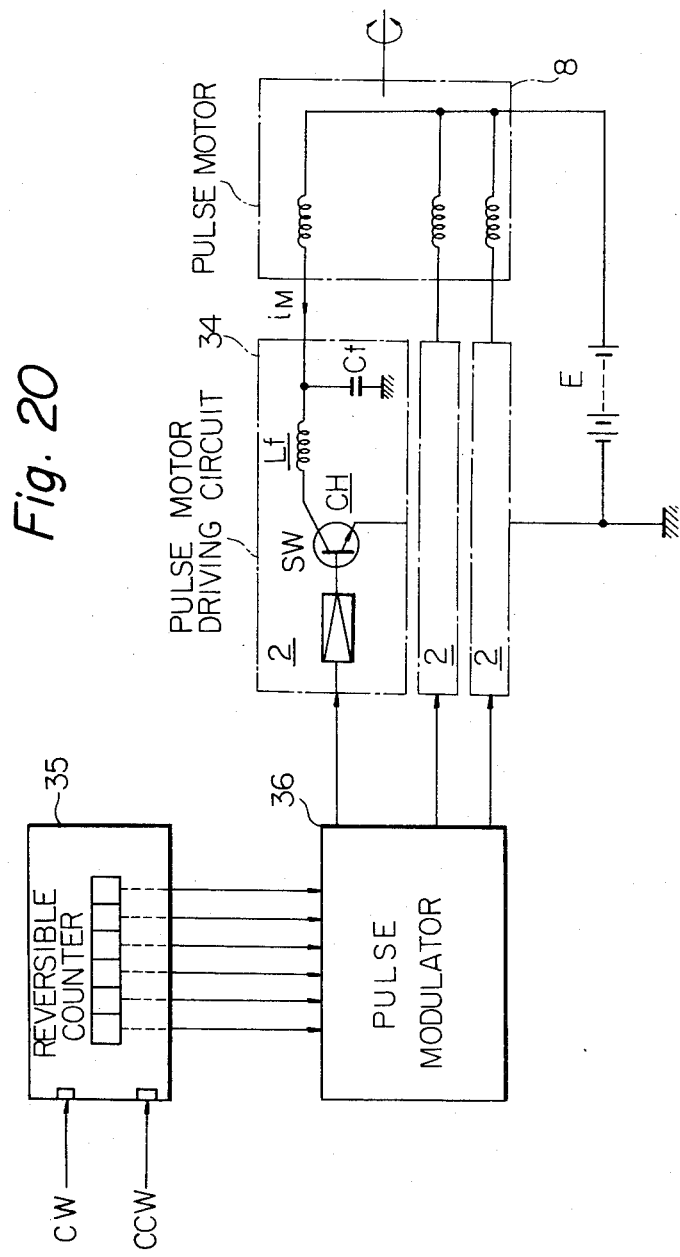
FIG. 20 is a block diagram showing another embodiment of the system according to the present invention.

As mentioned above, when the exciting current of the pulse motor is chopper controlled, the driving efficiency is considerably improved, because series resistances are not necessary in the exciting coils as in the conventional method. Further by controlling the ratio of the current which flows in each adjacent phase, a large number of steps can be obtained and precise control can be realized. However, when control of the current is carried out by chopper control, the advantages of high efficiency and many steps can be realized simultaneously. FIG. 20 shows one example where the current control of the exciting phase is carried out by chopper control. A three-phase pulse motor is used as a pulse motor, a reversible counter 35 and a pulse modulator 36 are provided for controlling a pulse motor driving circuit 34. This pulse modulator 36 generates pulses having a frequency which is variable in accordance with the content of the reversible counter 35 as is described later, and thereby operates the switching element SW of the driving circuit 34. This switching element SW is composed of the chopper circuit, and frequency modulated pulses which are converted from the switching element SW by inductances L into exciting currents having different mean values inversely proportional to the frequency. The exciting current which drives the five phase pulse motor by alternative three-phase/two-phase excitation is shown in Table I, and the exciting current in which the pulses are frequency modulated or pulse width modulated in accordance with the content of the decimal counter, that is, the counting state, is shown in Table XI in which 100 steps are obtained in alternative three-phase/two-phase excitation. Referring to this Table XI, 10, 0 correspond to 1, 0 in Table I, and 9, 8, 7, . . . 2, 1 correspond to partial excitation. Table XI is substantially the same as Table II, differing however in the partial excitation.

Table XI

| STEP PULSE | ESA | ESB | ESC | ESD | ESE | STEP PULSE | ESA | ESB | ESC | ESD | ESE |
|---|---|---|---|---|---|---|---|---|---|---|---|
| 0 | 10 | 10 | 10 | 0 | 0 | 8 | 2 | 10 | 10 | 0 | 0 |
| 1 | 9 | 10 | 10 | 0 | 0 | 9 | 1 | 10 | 10 | 0 | 0 |
| 2 | 8 | 10 | 10 | 0 | 0 | 10 | 0 | 10 | 10 | 0 | 0 |
| 3 | 7 | 10 | 10 | 0 | 0 | 11 | 0 | 10 | 10 | 1 | 0 |
| 4 | 6 | 10 | 10 | 0 | 0 | 12 | 0 | 10 | 10 | 2 | 0 |
| 5 | 5 | 10 | 10 | 0 | 0 | 13 | 0 | 10 | 10 | 3 | 0 |
| 6 | 4 | 10 | 10 | 0 | 0 | 14 | 0 | 10 | 10 | 4 | 0 |
| 7 | 3 | 10 | 10 | 0 | 0 | 15 | 0 | 10 | 10 | 5 | 0 |

Table XI (continued)

| STEP PULSE | ESA | ESB | ESC | ESD | ESE | STEP PULSE | ESA | ESB | ESC | ESD | ESE |
|---|---|---|---|---|---|---|---|---|---|---|---|
| 16 | 0 | 10 | 10 | 6 | 0 | 43 | 0 | 0 | 7 | 10 | 10 |
| 17 | 0 | 10 | 10 | 7 | 0 | 44 | 0 | 0 | 6 | 10 | 10 |
| 18 | 0 | 10 | 10 | 8 | 0 | 45 | 0 | 0 | 5 | 10 | 10 |
| 19 | 0 | 10 | 10 | 9 | 0 | 46 | 0 | 0 | 4 | 10 | 10 |
| 20 | 0 | 10 | 10 | 10 | 0 | 47 | 0 | 0 | 3 | 10 | 10 |
| 21 | 0 | 9 | 10 | 10 | 0 | 48 | 0 | 0 | 2 | 10 | 10 |
| 22 | 0 | 8 | 10 | 10 | 0 | 49 | 0 | 0 | 1 | 10 | 10 |
| 23 | 0 | 7 | 10 | 10 | 0 | 50 | 0 | 0 | 0 | 10 | 10 |
| 24 | 0 | 6 | 10 | 10 | 0 | 51 | 1 | 0 | 0 | 10 | 10 |
| 25 | 0 | 5 | 10 | 10 | 0 | 52 | 2 | 0 | 0 | 10 | 10 |
| 26 | 0 | 4 | 10 | 10 | 0 | 53 | 3 | 0 | 0 | 10 | 10 |
| 27 | 0 | 3 | 10 | 10 | 0 | 54 | 4 | 0 | 0 | 10 | 10 |
| 28 | 0 | 2 | 10 | 10 | 0 | 55 | 5 | 0 | 0 | 10 | 10 |
| 29 | 0 | 1 | 10 | 10 | 0 | 56 | 6 | 0 | 0 | 10 | 10 |
| 30 | 0 | 0 | 10 | 10 | 0 | 57 | 7 | 0 | 0 | 10 | 10 |
| 31 | 0 | 0 | 10 | 10 | 1 | 58 | 8 | 0 | 0 | 10 | 10 |
| 32 | 0 | 0 | 10 | 10 | 2 | 59 | 9 | 0 | 0 | 10 | 10 |
| 33 | 0 | 0 | 10 | 10 | 3 | 60 | 10 | 0 | 0 | 10 | 10 |
| 34 | 0 | 0 | 10 | 10 | 4 | 61 | 10 | 0 | 0 | 9 | 10 |
| 35 | 0 | 0 | 10 | 10 | 5 | 62 | 10 | 0 | 0 | 8 | 10 |
| 36 | 0 | 0 | 10 | 10 | 6 | 63 | 10 | 0 | 0 | 7 | 10 |
| 37 | 0 | 0 | 10 | 10 | 7 | 64 | 10 | 0 | 0 | 6 | 10 |
| 38 | 0 | 0 | 10 | 10 | 8 | 65 | 10 | 0 | 0 | 5 | 10 |
| 39 | 0 | 0 | 10 | 10 | 9 | 66 | 10 | 0 | 0 | 4 | 10 |
| 40 | 0 | 0 | 10 | 10 | 10 | 67 | 10 | 0 | 0 | 3 | 10 |
| 41 | 0 | 0 | 9 | 10 | 10 | 68 | 10 | 0 | 0 | 2 | 10 |
| 42 | 0 | 0 | 8 | 10 | 10 | 69 | 10 | 0 | 0 | 1 | 10 |

Table XI (continued)

| STEP PULSE | ESA | ESB | ESC | ESD | ESE | STEP PULSE | ESA | ESB | ESC | ESD | ESE |
|---|---|---|---|---|---|---|---|---|---|---|---|
| 70 | 10 | 0 | 0 | 0 | 10 | 86 | 10 | 10 | 0 | 0 | 4 |
| 71 | 10 | 1 | 0 | 0 | 10 | 87 | 10 | 10 | 0 | 0 | 3 |
| 72 | 10 | 2 | 0 | 0 | 10 | 88 | 10 | 10 | 0 | 0 | 2 |
| 73 | 10 | 3 | 0 | 0 | 10 | 89 | 10 | 10 | 0 | 0 | 1 |
| 74 | 10 | 4 | 0 | 0 | 10 | 90 | 10 | 10 | 0 | 0 | 0 |
| 75 | 10 | 5 | 0 | 0 | 10 | 91 | 10 | 10 | 1 | 0 | 0 |
| 76 | 10 | 6 | 0 | 0 | 10 | 92 | 10 | 10 | 2 | 0 | 0 |
| 77 | 10 | 7 | 0 | 0 | 10 | 93 | 10 | 10 | 3 | 0 | 0 |
| 78 | 10 | 8 | 0 | 0 | 10 | 94 | 10 | 10 | 4 | 0 | 0 |
| 79 | 10 | 9 | 0 | 0 | 10 | 95 | 10 | 10 | 5 | 0 | 0 |
| 80 | 10 | 10 | 0 | 0 | 10 | 96 | 10 | 10 | 6 | 0 | 0 |
| 81 | 10 | 10 | 0 | 0 | 9 | 97 | 10 | 10 | 7 | 0 | 0 |
| 82 | 10 | 10 | 0 | 0 | 8 | 98 | 10 | 10 | 8 | 0 | 0 |
| 83 | 10 | 10 | 0 | 0 | 7 | 99 | 10 | 10 | 9 | 0 | 0 |
| 84 | 10 | 10 | 0 | 0 | 6 | 100 | 10 | 10 | 10 | 0 | 0 |
| 85 | 10 | 10 | 0 | 0 | 5 | | | | | | |

Figure 21:
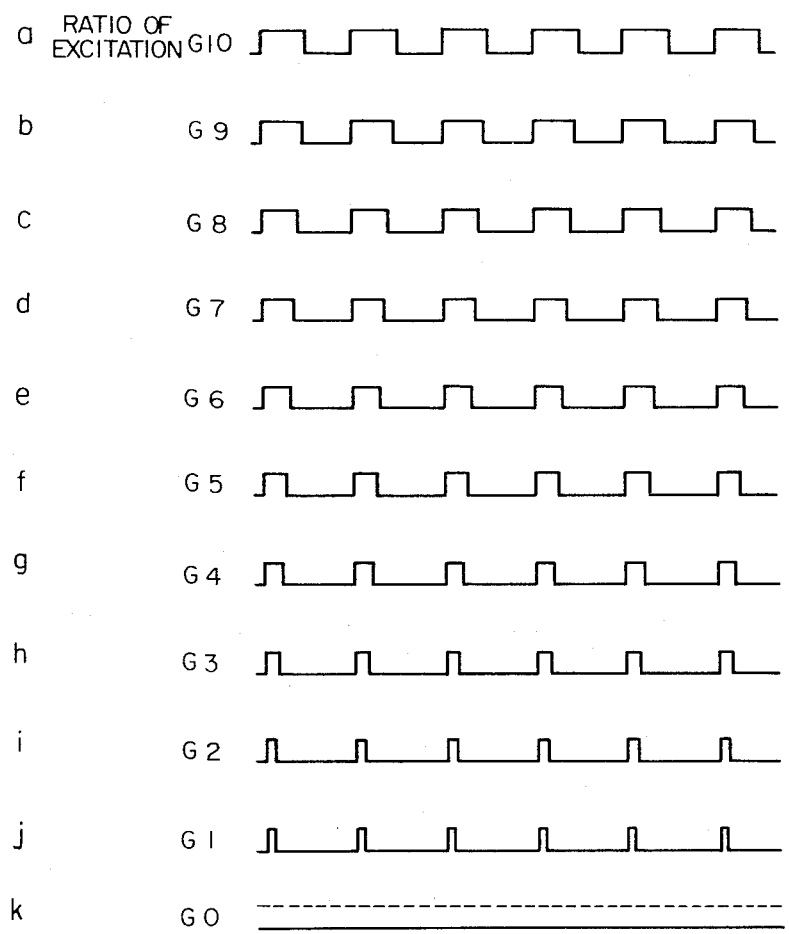
FIGS. 21 – 22 are diagrams showing the waveforms in the system shown in FIG. 19.
Figure 22:
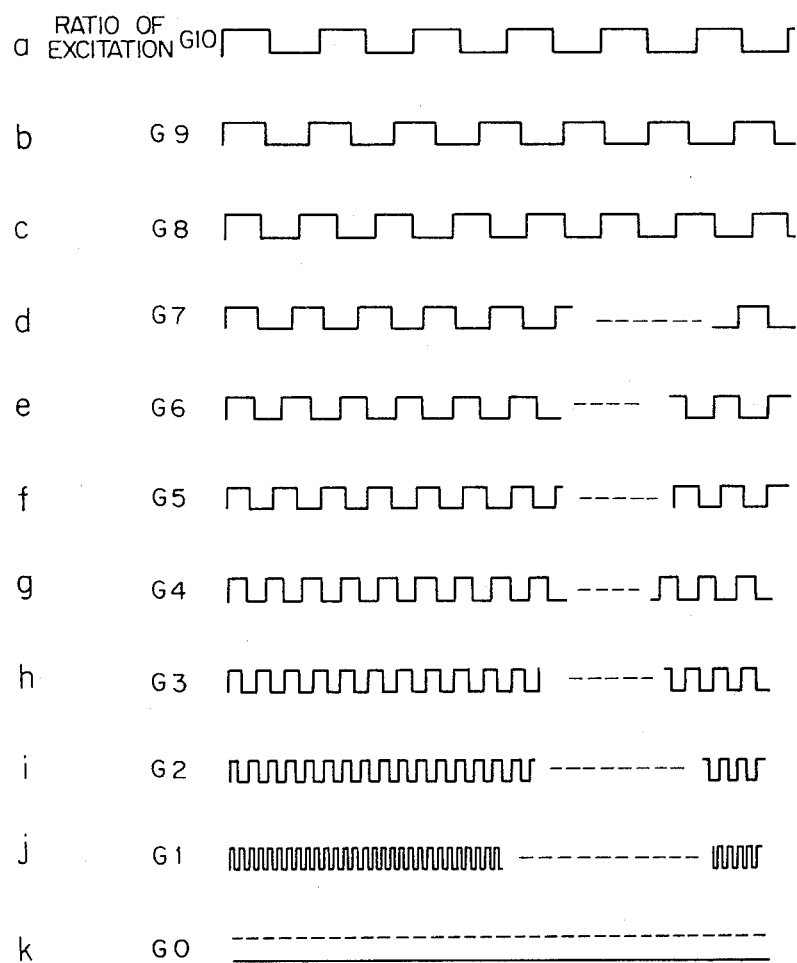

The partial excitation in Table Xi is defined, in the case of pulse width modulation as excitation by the pulse width being varied in accordance with the numerical values shown in the pulse waveform $G_9-G_1$ of FIG. 21. In the case of frequency modulation, excitation by varying the frequency of the pulse inversely proportionally to the numerical values 9 ~ 1 is shown in FIG. 22. In both cases, the mean value of the current exciting the corresponding exciting phases of the pulse motor varies (in this case, decreases) with the full excitation, and then the ratio of ampere turns to the adjacent fully excited phase also varies and thereby a number of steps much larger than the number of steps in the conventional method can be obtained. The series of pulses shown in FIGS. 21 and 22 are easily obtained by a simple transisterized chopper circuit, as shown for example in FIG. 20.

Figure 23:
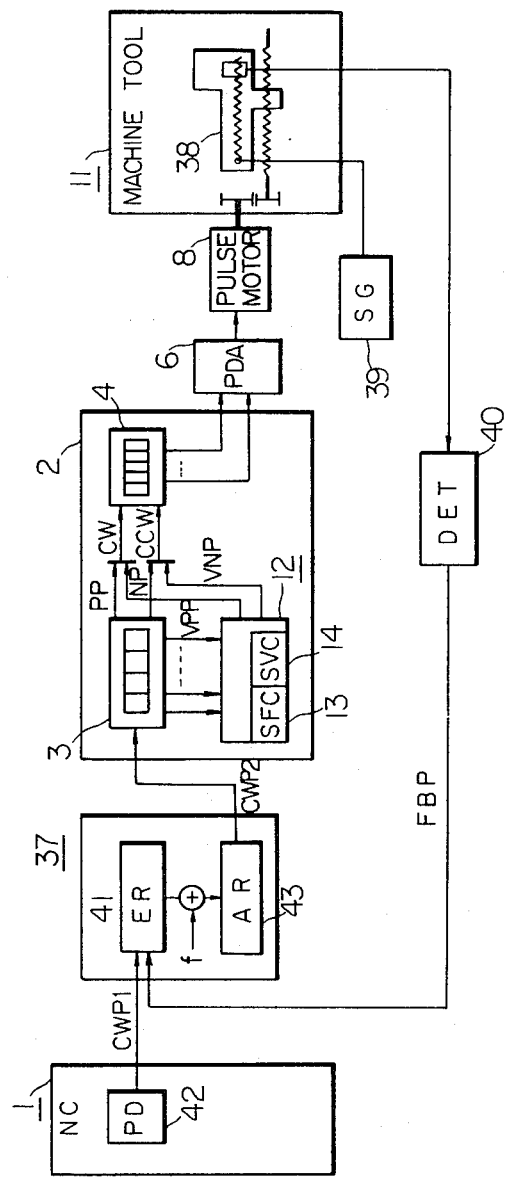
FIGS. 23 – 24 are block diagrams of the numerical controlling machine utilizing the principle of the present invention.

FIG. 23 relates to one example of the numerical control apparatus utilized in the present invention. Applying the present invention to the numerical control apparatus, the sizing of the machine tool can be effected finely, and high precision control can be carried out. However, in FIG. 23, a system is considered where the position of the displacement of the machine tool is detected by a position detector such as an inductosyn. Referring to FIG. 23, the drive command pulse $CWP_1$ from the numerical control apparatus 1 is supplied via an error detector circuit 37 to the control circuit 2 and to the driving circuit 6 and the output of the driving circuit 6 drives the pulse motor 8. The position of the displacement of the machine tool 11 is detected by the position detector 38. For example, the signal from a standard signal generator 39 is supplied to the error detector circuit 38 and the signal corresponding to the displaced position is taken out from said error detector circuit 38 and supplied to a displacement detector 40. The output FBP of the displacement detector 40 is applied to an error register 41 of the error detector circuit 37 and compared with the drive command pulse $CWP_1$. When there exists a difference between the command pulse $CWP_1$ and the signal FBP, a pulse corresponding to said difference is supplied via an accumulator 43 to the n number system counter 3 of the control circuit 2 and the error is then corrected. As this correction of the error is carried out digitally, the control can be carried out precisely and stably.

Figure 24:
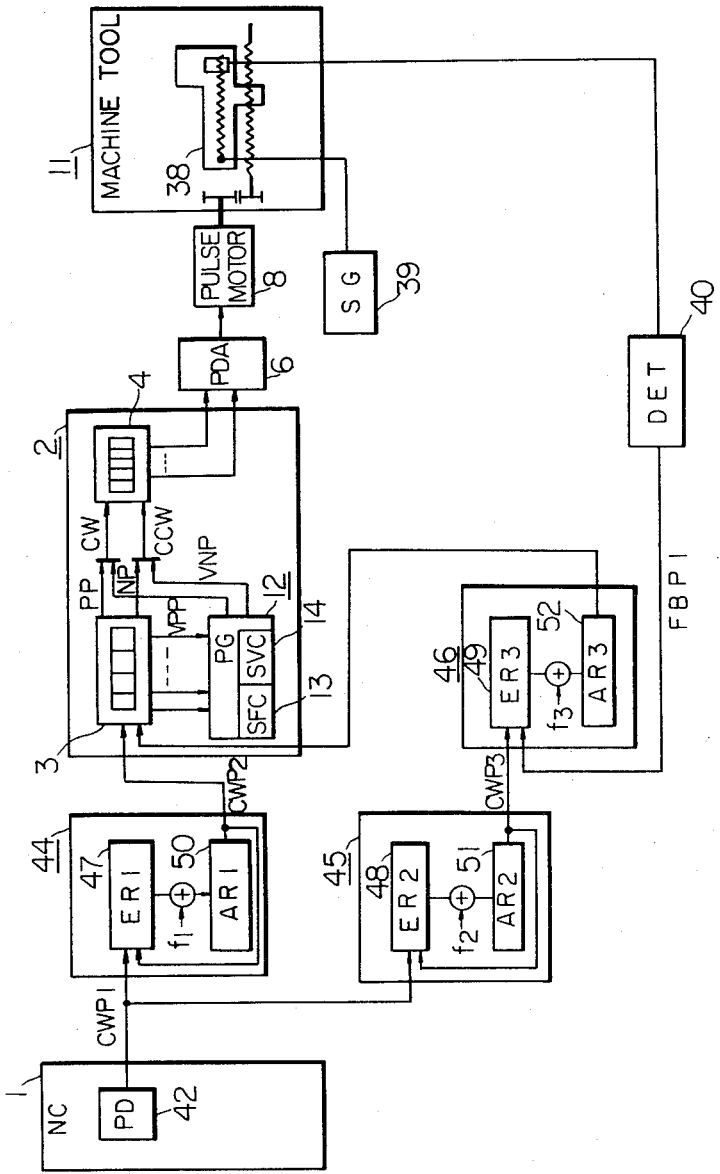

FIG. 24 is the same as FIG. 23 except for a consideration of the time delay of the servo-mechanism system. Namely, the command pulse $CWP_1$ from a pulse distributor 42 of the numerical control apparatus 1 is supplied via a smoothing circuit 44 to the n number system counter 3 of the control circuit as a command pulse $CWP_2$. On the other hand, the command pulse $CWP_1$ is supplied to an error eliminating circuit 45 and compensates for the time corresponding to the time delay of the servo system, and the output command pulse $CWP_3$ is supplied to the error detector circuit 46. The command pulse $CWP_3$ and the signal $FBP_1$ from the displacement detector circuit 40 are compared in the error detector circuit 46, and the difference between them, if any, is supplied to the n number system counter 3 as an error signal $FBP_2$. In this case, the time delay of the servo system is taken into consideration, and more stable and precise control can be realized. Referring to FIG. 24, the pulse smoothing circuit 44, the error eliminating circuit 45 and the error detector circuit 46 are composed of, respectively, error detectors 46, 47 and 48 and accumulators 49, 50 and 51.

What is claimed is:

1. A system for driving a pulse motor having a plurality of exciting coils and a rotor comprising:
   a. a source of command pulses having substantially uniform widths,
   b. means being connected between said (a) source and said pulse motor for controlling the stepping of said rotor, said stepping control means including:

1. a counter for counting said command pulses, and
   2. circuit means connected to said counter which includes
      i. first means for selecting a predetermined plurality of said exciting coils to be excited simultaneously and for supplying exciting signals to said predetermined plurality of coils, and
      ii. second means for determining the duty cycle of each exciting signal supplied to said selected exciting coils as a function of the count in said counter.

2. A system for driving a pulse motor according to claim 1 wherein said i means includes:
   means for changing the phase of excitation so as to step the rotor of said pulse motor in the forward direction or the reverse direction every time a positive pulse or negative pulse is received, and
   means for supplying the exciting signal to the exciting coils in accordance with said phase of excitation; and wherein said second means includes:
   a pulse generator for generating a plurality of control pulses having a constant period and varying pulse widths,
   a gate circuit for selecting a pulse out of said control pulses corresponding to the count in said counter,
   means for generating a group of positive pulses and negative pulses having a phase difference corresponding to the pulse width of said selected pulse, and
   means for supplying the overflow pulses of said counter and said group of positive pulses as positive pulses and the difference pulses of said counter and said group of negative pulses as negative pulses to said first means.

3. A system of driving a pulse motor according to claim 1 further comprising means for controlling the switching action of said second means on said exciting signal in synchronism with said command pulses.

4. A system of driving a pulse motor according to claim 1 wherein means are provided to chop said exciting signals.

5. A system of driving a pulse motor according to claim 1 further comprising:
   detecting means for detecting the displacement of said rotor and producing a position signal corresponding thereto,
   comparing means for comparing said position signal with said command pulses,
   compensation pulse generating means for generating compensation pulses in accordance with the difference between said position signal and said command pulses, and
   means for adding said compensation pulses to said command pulses.

6. A system for driving a pulse motor having a plurality of exciting coils and a rotor comprising:
   a. a source of command pulses having substantially uniform widths,
   b. means being connected between said (a) source and said pulse motor for controlling the stepping of said rotor, said stepping control means including:

1. a counter for counting said command pulses, and 2. circuit means connected to said counter which includes
      i. a pulse generator coupled to said counter for generating control pulses having a constant period and variable pulse widths,
      ii. a gate circuit coupled to said pulse generator and said counter for selecting said predetermined plurality of coils to be excited simultaneously in accordance with the count in said counter and also for selecting a plurality of said control pulses to determine the duty cycle of each exciting signal supplied to said selected coils in accordance with the count in said counter, and
      iii. means for supplying said exciting signals to said predetermined plurality of said exciting coils.

* * * * *